(12) United States Patent
Kawabata

(10) Patent No.: US 11,082,423 B2
(45) Date of Patent: Aug. 3, 2021

(54) COMMUNICATIONS SYSTEM, COMMUNICATIONS DEVICE USED IN SAME, MANAGEMENT DEVICE, AND INFORMATION TERMINAL

(71) Applicant: PROSPER CREATIVE CO., LTD., Tokyo (JP)

(72) Inventor: Hideki Kawabata, Tokyo (JP)

(73) Assignee: PROSPER CREATIVE CO., LTD., Tokyo (JP)

( * ) Notice: Subject to any disclaimer, the term of this patent is extended or adjusted under 35 U.S.C. 154(b) by 299 days.

(21) Appl. No.: 16/314,275

(22) PCT Filed: Jun. 29, 2017

(86) PCT No.: PCT/JP2017/023940
§ 371 (c)(1),
(2) Date: Dec. 28, 2018

(87) PCT Pub. No.: WO2018/003919
PCT Pub. Date: Jan. 4, 2018

(65) Prior Publication Data
US 2019/0273733 A1    Sep. 5, 2019

(30) Foreign Application Priority Data

Jun. 29, 2016 (JP) .............................. JP2016-128381

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *H04L 9/10* (2013.01); *H04L 9/32* (2013.01);
(Continued)

(58) Field of Classification Search
CPC . H04L 63/083; H04L 9/10; H04L 9/32; H04L 63/0428; H04L 63/0876;
(Continued)

(56) References Cited

U.S. PATENT DOCUMENTS

2004/0187018 A1   9/2004 Owen et al.
2005/0144032 A1*  6/2005 Shimoda ................ G06Q 30/06
                                                 705/26.1
(Continued)

FOREIGN PATENT DOCUMENTS

JP       2004-80743 A      3/2004
JP      2006-166028 A      6/2006
(Continued)

OTHER PUBLICATIONS

Mar. 22, 2019 Extended European Search Report issued in European Patent Application No. 17820273.5.
(Continued)

*Primary Examiner* — Arvin Eskandarnia
(74) *Attorney, Agent, or Firm* — Oliff PLC

(57) ABSTRACT

A communications system includes a device connected to information terminals to enable a plurality of information terminals, mutually exchange data via a global network and enable highly confidential mutual communications between the information terminals included. The communications device includes a unit storing user authentication information for performing user authentication via the connected information terminal and pre-storing a device authentication listing pieces of device information in authentication of each communications device with regard to all the communications devices in the same group, the device authentication list being pre-stored in a state where the device authentication list is inaccessible from the user. When exchange of data is performed between the information terminals via the
(Continued)

global network, the communications device configured to carry out user authentication process with the information terminal using the user authentication information and device-to-device authentication process with another communications device by referring to the device authentication list.

21 Claims, 21 Drawing Sheets

(51) Int. Cl.
    *H04W 12/06*     (2021.01)
    *H04L 9/10*     (2006.01)
    *H04L 9/32*     (2006.01)
    *H04W 12/033*     (2021.01)

(52) U.S. Cl.
    CPC ...... *H04L 63/0428* (2013.01); *H04L 63/0876* (2013.01); *H04L 63/0884* (2013.01); *H04L 63/101* (2013.01); *H04L 63/104* (2013.01); *H04W 12/033* (2021.01); *H04W 12/06* (2013.01); *G06F 2221/2115* (2013.01); *H04L 2463/082* (2013.01)

(58) Field of Classification Search
    CPC . H04L 63/0884; H04L 63/101; H04L 63/104; H04L 2463/082; G06F 21/31; G06F 2221/2115; H04W 12/06; H04W 12/0013
    See application file for complete search history.

(56) References Cited

U.S. PATENT DOCUMENTS

| | | | | |
|---|---|---|---|---|
| 2009/0028101 | A1* | 1/2009 | Kakumaru | H04W 12/068 370/329 |
| 2013/0155948 | A1* | 6/2013 | Pinheiro | H04W 76/10 370/328 |
| 2014/0233058 | A1* | 8/2014 | Aritomi | G06F 3/1267 358/1.15 |
| 2016/0021192 | A1* | 1/2016 | Passichenko | H04L 51/00 713/168 |
| 2016/0087972 | A1 | 3/2016 | Ahmavaara et al. | |
| 2017/0006471 | A1* | 1/2017 | Kim | H04L 63/083 |

FOREIGN PATENT DOCUMENTS

| | | |
|---|---|---|
| JP | 2008-181427 A | 8/2008 |
| JP | 2011-45050 A | 3/2011 |
| JP | 2011-199847 A | 10/2011 |
| JP | 2015-158610 A | 9/2015 |
| WO | 2011/014037 A2 | 2/2011 |
| WO | 2012/135680 A1 | 10/2012 |
| WO | 2016/093368 A | 6/2016 |

OTHER PUBLICATIONS

Sep. 12, 2017 International Search Report issued in International Patent Application No. PCT/JP2017/023940.

Umezawa et al.; "Proposal of authentication system by federation of mobile terminal and public terminal"; FIT 2011 Dai 10 Kai Forum on Information Technology Koen Ronbunshu; vol. 4, pp. 255-262; Aug. 22, 2011.

Date et al.; "Dynamic Rule Generation using Machine Learning on a Security Gateway for In-vehicle LAN"; SCIS2016, 3F2-1, pp. 1-6; Jan. 22, 2016.

* cited by examiner

| DEVICE ID | SURNAME | NAME | NICKNAME | e-mail | PRIVILEGE | ORGANIZATION (COMPANY ID) | STATE | UPDATE DATE /TIME |
|---|---|---|---|---|---|---|---|---|
| 0001 | ○○○ | ○○○ | ○○○ | ○@○○ | USER | 0002 | 1 (VALID) | YEAR/MONTH/DAY /HOUR/MINUTE/SECOND |
| 0002 | ○○○ | ○○○ | ○○○ | ○@○○ | USER | 0002 | 0 (INVALID) | YEAR/MONTH/DAY /HOUR/MINUTE/SECOND |
| 0003 | ○○○ | ○○○ | ○○○ | ○@○○ | GROUP MANAGEMENT PIC | 0001 | 1 (VALID) | YEAR/MONTH/DAY /HOUR/MINUTE/SECOND |

| DEVICE ID | SWITCH HEADER | PASSWORD | PW HASH DATA |
|---|---|---|---|
| 001 | 00 | ******** | ******** |
| 001 | 01 | ******** | ******** |
| ⋮ | ⋮ | ⋮ | ⋮ |
| 001 | 99 | ******** | ******** |
| 002 | 00 | ******** | ******** |
| 002 | 01 | ******** | ******** |
| ⋮ | ⋮ | ⋮ | ⋮ |

FIG. 6

| COMPANY ID | COMPANY NAME |
|---|---|
| 0001 | ○ ○ ○ |
| 0002 | ○ ○ ○ |
| 0003 | ○ ○ ○ |

21c3

| GROUP ID | GROUP NAME | MEMBER 1 (DEVICE ID) | MEMBER 2 (DEVICE ID) | ... | MEMBER N (DEVICE ID) | UPDATE DATE/TIME |
|---|---|---|---|---|---|---|
| 0001 | ○ ○ ○ | 0003 | 0002 | | | YEAR/MONTH/DAY/HOUR /MINUTE/SECOND |
| 0002 | ○ ○ ○ | 0001 | 0002 | | | YEAR/MONTH/DAY/HOUR /MINUTE/SECOND |
| 0003 | ○ ○ ○ | 0001 | 0003 | | | YEAR/MONTH/DAY/HOUR /MINUTE/SECOND |

| SWITCH HEADER | COMMON KEY |
|---|---|
| 00 | ****** |
| 01 | ****** |
| 02 | ****** |
| 03 | ****** |
| ⋮ | ⋮ |

21d1

(b)

| SWITCH HEADER | PRIVATE KEY | PUBLIC KEY |
|---|---|---|
| 00 | ****** | ****** |
| 01 | ****** | ****** |
| 02 | ****** | ****** |
| 03 | ****** | ****** |
| ⋮ | ⋮ | ⋮ |

21d2

(c)

| DEVICE ID | SWITCH HEADER | PUBLIC KEY |
|---|---|---|
| 0001 | 00 | ****** |
| 0001 | 01 | ****** |
| ⋮ | ⋮ | ⋮ |
| 0001 | 99 | ****** |
| 0002 | 00 | ****** |
| ⋮ | ⋮ | ⋮ |

| DATA ID | SUBJECT | CONFIDENTIALITY LEVEL | VIEWING PERIOD | ALLOWABLE VIEWING COUNTS | VIEWING COUNTS (REMAINING) |
|---|---|---|---|---|---|
| 0001 | ○○○ | 0 (PERSONAL) | ○~○ | 1 | 0 |
| 0002 | ○○○ | 2 (CONFIDENTIAL) | ○~○ | UNLIMITED | UNLIMITED |
| 0003 | ○○○ | 1 (IMPORTANT) | ○~○ | 1 | 1 |

| SENDER (DEVICE ID) | RECIPIENT (DEVICE ID) | COMMENT | DATA STORAGE LOCATION | TRANSMISSION DATE/TIME |
|---|---|---|---|---|
| 0003 | 0002 | ○○○○ | .../.../... | YEAR/MONTH/DAY/HOUR/MINUTE/SECOND |
| 0001 | 0003 | ○○○○ | .../.../... | YEAR/MONTH/DAY/HOUR/MINUTE/SECOND |
| 0003 | 0001 | ○○○○ | .../.../... | YEAR/MONTH/DAY/HOUR/MINUTE/SECOND |

21f

| | | |
|---|---|---|
| ENVELOPE NAME (REQUIRED) | [____] 72a | 72 |
| VIEWING PERIOD (REQUIRED) | FROM: [____]<br>TO: [____] 72b | |
| TRANSMISSION LEVEL | ● PERSONAL  ○ IMPORTANT  ○ CONFIDENTIAL 72c | |
| VIEWING RESTRICTION | ☐ ONE TIME VIEWABLE 72d | |
| DESTINATION | ☐ USER B<br>☐ USER C  72e | |
| FILE | 1. [SELECT FILE]  ○ ○ ○ .jp 72f<br>[ADD FIELD] | |
| COMMENT | [____] 72g | |
| | [SEND] 72h | |

COMMUNICATIONS SYSTEM, COMMUNICATIONS DEVICE USED IN SAME, MANAGEMENT DEVICE, AND INFORMATION TERMINAL

TECHNICAL FIELD

The present invention relates to a communications system enabling exchange of data between an information terminal and another information terminal via a global network, a communications device, a management device, and an information terminal for use in the communications system.

BACKGROUND ART

Enabling data exchange between one information terminal and another information terminal via a global network is very convenient and how to ensure security is of great importance in the data exchange.

According to a known approach amongst others, two communications devices functioning as routers are connected to each other via a VPN (virtual private network), and an information terminal placed in one private network to which one of these communications devices is connected and another information terminal placed in another private network to which the other of the communications devices is connected are connected to each other in a simulative manner as in a local area network (LAN).

Whilst this VPN connection can ensure high security by tunneling and encryption, it takes much time and labor for initial setting and various operational settings.

According to known attempts that have been developed for improvements in the context of such a problem, a centralizing server is used or structured overlay is used (for example, see Patent Literature 1).

CITATION LIST

Patent Literature

Patent Literature 1: Japanese Patent Laid-Open No. 2011-45050

SUMMARY OF INVENTION

Technical Problem

According to the above-identified document, the time and labor needed in settings for communications device at the time of the introduction of the system may be reduced to a certain extent but the need of operations associated with the settings remains to exist. Also, when a conventional router is replaced by a dedicated communications device capable of VPN connection in order to introduce this communications system, it is often necessary to change the network configuration on the side of the information terminal residing inside the communications device and the problem associated with the reduction in time and labor is left unresolved.

An object of the present invention is to provide a communications system, a communications device used therewith, a management device used thereon, and an information terminal used therewith, which reduce the time and labor associated with the introduction of the system in exchanging data via a global network between one information terminal and another information terminal, excel in extensibility of the terminals and groups, and are capable of ensuring high security.

Solution to Problem

In order to solve the above-identified problem, a communications system of the present invention is a communications system enabling a plurality of information terminals included in a same group to exchange data with each other via a global network. The communications system includes a communications device connected to each of information terminals in the group so as to perform mutual communication of high confidentiality between the plurality of information terminals included in the group. The communications device includes a storage unit storing user authentication information for performing authentication of a user via the connected information terminal and pre-storing a device authentication list listing pieces of device authentication information necessary in authentication of each communications device with regard to all the communications devices in the same group, the device authentication list being pre-stored in a state where the device authentication list is inaccessible from the user. When exchange of data is performed between the information terminals via the global network, the communications device configured to carry out user authentication process with the information terminal using the user authentication information and device-to-device authentication process with another communications device by referring to the device authentication list.

According to the communications system in accordance with one embodiment, a management device is provided which is connected to the global network and configured to carry out at least part of the device-to-device authentication process between the communications devices, wherein the device authentication list lists pieces of device authentication information necessary in authentication of the communications device and the management device with regard to all the communications devices and all of the management devices in the same group, and the communications device and the management device have a storage unit pre-storing the device authentication list in a state where at least part of the device authentication list is inaccessible by the user.

The device authentication list may include device authentication information including, for example, a device ID and a password of the already-registered communications devices in the group and device authentication information including a device ID and a password of a provisional user predefined for an unregistered communications device in the group, and the management device or the communications device may enable, for example, the device ID and the password of the provisional user when a new user is registered in the group, and notify the device IDs of the enabled users to all of the communications devices.

The device authentication list may include, for example, a provisional group name predefined for an unregistered group and device authentication information including a device ID and a password of a provisional user included in the provisional group name; and, when a new group is registered, the management device or the communications device, for example, may rewrite the provisional group name to a true group name, enable a device ID and a password of at least some of the provisional users of the true group name, and notify the rewritten true group name and the device ID of the enabled users to the communications device of the enabled user of the new group.

At least part of an encryption key for performing encrypted communication between the communications devices or trigger information for triggering generation of the encryption key may be stored in the storage unit of the communications device in a state where the at least part is inaccessible from the user. Also, for example, at least part of an encryption key for performing encrypted communication between the communications devices and between the communications device and the management device or trigger information for triggering generation of the encryption key may be stored in the storage unit of the management device, in a state where the at least part is inaccessible from the user.

It should be noted that the information terminals include, for example, pieces of equipment receiving and transmitting various pieces of data such as a personal computer, a smartphone, and a tablet terminal operated by a user, IoT (Internet of Things) equipment, M2M (Machine to Machine) equipment, a camera, a robot, remote operation equipment, an automobile, and AI (Artificial Intelligence) equipment.

The communications device may include, for example, a user authentication unit configured to determine whether or not permission for access should be given in response to an access request from the information terminal on the basis of user authentication information stored in the storage unit; a device-to-device authentication unit configured to carry out device-to-device authentication process with the other communications device on the basis of device authentication list stored in the storage unit; an input/output unit configured to input and output information to and from an information terminal to which permission to access is given by the user authentication unit; and a data transmission/reception unit configured to perform transmission and reception of data with the other communications device authenticated by the device-to-device authentication unit.

A communications device according to the present invention is a communications device connected to each of a plurality of information terminals in a same group so as to perform mutual communication of high confidentiality between the plurality of information terminals included in the group in a communications system enabling the plurality of information terminals included in the group to exchange data with each other via a global network, the communications device comprising a storage unit storing user authentication information for performing authentication of a user via the connected information terminal and pre-storing a device authentication list listing pieces of device authentication information necessary in authentication of each communications device with regard to all the communications devices in the same group, the device authentication list being pre-stored in a state where at least part of the device authentication list is inaccessible from the user. When exchange of data is performed between the information terminals via the global network, the communications device configured to carry out user authentication process with the information terminal using the user authentication information and device-to-device authentication process with another communications device by referring to the device authentication information.

Also, a management device according to the present invention is a management device configured to carry out at least part of device-to-device authentication process between communications devices connected to each of a plurality of information terminals included in a same group so as to perform mutual communications with high confidentiality between the information terminals included in the group in a communications system enabling the plurality of information terminals included in the same group to exchange data with each other via a global network, the management device including a storage unit pre-storing a device authentication list listing pieces of device authentication information necessary in authentication of the individual communications devices with regard to all the communications devices in the same group. When exchange of data is performed between the information terminals via the global network, the management device configured to carry out device-to-device authentication process by referring to the device authentication list between the communications devices.

The communications device may include: a history analysis unit configured to analyze communication history stored as needed in the storage unit; and an abnormality determination unit configured to determine an unauthorized access or an unauthorized operation on the basis of a day-to-day operating status of the communications device analyzed by the history analysis unit.

The communications device may have a position sensor to be configured to determine whether or not the communications device is located at a position where the communications device should be originally used by referring to position information acquired from the position sensor.

The input/output unit may be configured to present to the information terminal a data entry screen imitating a postal item or a slip as a user interface.

The communications device or the management device may include information acquired from IoT equipment or M2M equipment, the information being included in the data being exchanged.

The communications device or the management device may have an AI function carrying out machine learning based on data acquired from another communications device or a management device and providing an optimum solution.

The communications device may include a connection device pre-storing information and configured to be removable. Also, the communications device may be an IC card or SIM attached to the information terminal and may also be a communication circuit and communication software incorporated into a mobile terminal.

Advantageous Effects of Invention

According to the present invention, when data is exchanged between information terminals via a global network, user authentication process using user authentication information can be carried out between the communications device and the information terminal and device-to-device authentication process by referring to the device authentication list can be carried out between the communications device and another communications device. By virtue of this, settings by users only involve registration of his/her own user authentication information whilst the authentication processing is performed on the basis of the device authentication list preset (stored) between the communications devices. As a result, users' time and labor associated with the introduction are reduced. Also, since the device authentication list, at least part of it, is preset (stored) in the storage unit of each communications device in a state where the at least part of it is inaccessible from users, communication security for performing exchange of data between information terminals is easily ensured.

BRIEF DESCRIPTION OF DRAWINGS

FIG. 4 is a diagram illustrating a data structure of a device authentication information storage unit.

FIG. 5 is a diagram illustrating the data structure of the device authentication information storage unit.

FIG. 6 is a diagram illustrating the data structure of the device authentication information storage unit.

FIG. 8 is a diagram illustrating a data structure of encryption key information storage unit.

FIG. 9 is a diagram illustrating a data structure of a target data storage unit.

DESCRIPTION OF EMBODIMENTS

Figure 1:
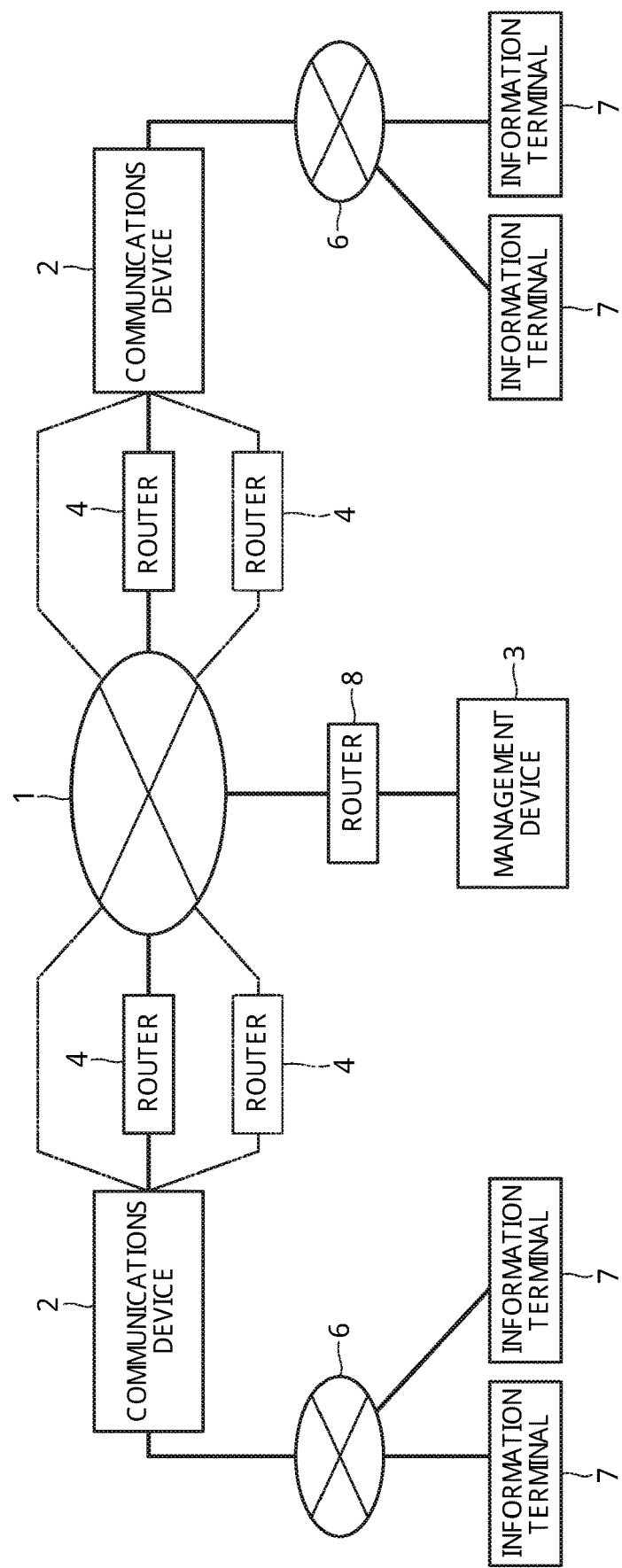
FIG. 1 is an explanatory diagram illustrating an outline of a communications system in which the present invention is implemented.

FIG. 1 is an explanatory diagram that illustrates an outline of a communications system (hereinafter referred to as "this communications system") in which the present invention is implemented. The illustrated communications system includes two or more (two in the illustrated example) communications devices 2, 2 connected to each other via an external network 1 which is a global network supporting general-purpose communication protocols such as TCP/IP, and a management device 3 connected to the respective communications devices 2 via the external network 1.

The communications device 2 performs communications with the external network 1 via a router 4 and is capable of communications with one or more information terminals 7 via an internal network 6 which is a private network configured inside the router 4 and supporting general-purpose communications protocols such as TCP/IP. Here, "inside" when viewed from a device connected between the external network 1 and the internal network 6 refers to the side of the internal network 6 and "outside" refers to the side of the external network 1. The details of the configuration of the communications device 2 will be described later.

In the communications system of this embodiment, a device authentication list for mutual authentication between the communications devices 2 is configured in the communications device 2 in a state where a user cannot make any direct intervention in at least part of the list, and specific group communication by multifactor authentication is performed based on this device authentication list plus user authentication information which is configured individually by a user so as to enhance the security of the communications between specific groups. Here, the device authentication list and the user authentication information include an ID and a password (including a hashed password) for carrying out the authentication. Also, an encryption key (common key, public key, or private key) for concealing various pieces of data and transmitting them or trigger information for triggering generation of these keys are stored in the communications device 2 and the management device 3.

Also, in the communications system of this embodiment, in order to flexibly respond to changes associated with communications, settings are made on the communications device 2 and the management device 3 at the time of shipment including those intended for unregistered users or unregistered groups in advance considering addition of users in the future. When any change is to be made, a person in charge of management of a group or groups makes the change at issue by simply submitting an application by means of an electronic document to a system administrator and by using a tool for making the change, which is used by the person in charge of management of groups. Also, the device authentication information maintains safety of the information by implementing management by dividing it into the management of information for which a high level of confidentiality is required such as passwords needed in the device authentication and the management of information of a lower degree of confidentiality which can be viewed by all users such as a name and a nickname of a user. Any user having the communications device 2 at hand can configure a dedicated group in the capacity of a person in charge of management of his/her own group. Also, a user of a certain group can also submit to the system administrator an application for user registration or group registration by an electronic document as a user of another group.

It should be noted here that the term "communication(s)" as used herein encompasses both wireless communications and wired communications.

Also, the term "communications system" as used herein is a concept that encompasses a network (the external network 1 and the internal network 6 in this example) and all pieces of communication equipment performing communications via the network (the communications device 2, the management device 3, and the information terminal 7 in this example).

Also, the term "secret area" refers to a storage area capable of storing pieces of confidential information such as a password to be concealed, an encryption key, or trigger information for triggering generation thereof in a state where they cannot be accessed externally by users and corresponds, for example, to TrustZone™, etc. in the memory area of a CPU. According to TrustZone, the operating modes of a CPU are divided into a normal area and a secure area. In the secure area, a secure OS operates, on which applications run while the confidential information is located in the secure area placed in a monitor mode.

Specifically, in the "secret area," areas are created by physically separating the memory space within the CPU, and on the side of the secure area segregated from the space in which the general-purpose OS operates, a dedicated OS operates to implement secure information management in the system back-end. By virtue of the scheme according to which the secure area cannot be recognized from the side of the general-purpose OS while the normal operations of the general-purpose OS can be seen from the side of the secure area, it is made possible to prevent attacks from outside and acts of intentionally compromising the secure mechanism and placing another mechanism.

Also, the term "information terminal" encompasses pieces of equipment that receive and transmit various pieces of data such as a personal computer, smartphone, and tablet terminal operated by a user as well as IoT devices, M2M devices, cameras, robots, remote-controlled devices, automobiles, AI devices, and the like and, for example, refers to a PC, communication terminal, and mobile phone terminal operated by an operating system such as Windows™, Mac OS™, and Linux™. The term "user" encompasses all persons who are using or attempting to use this communications system. Multiple operating systems may be used at the same time as the OS of the information terminal and multiple operating systems may be switched on the information terminal.

Also, the term "communications device" encompasses connection devices that is arranged between a terminal device and a network and configured to interconnect terminal devices to each other via the network, where the connection devices may be purchased by one or more users from a provider or providers providing the services of this communications system or any person or entity entrusted by the provider(s) or rented from them to use them, for example, an EPROM unit incorporated in a concealed area of an AT compatible machine, dedicated communication equipment, PC, smart phone, IoT equipment, and tablet terminal having a communication function, an IC card and a subscriber identity module (SIM) to be attached to these pieces of equipment, and multifunction devices combining the aforementioned pieces of equipment having the communication function.

Also, the term "communications device" may refer to a communication circuit and communication software incorporated into a mobile terminal such as a smartphone or a communication circuit and communication software incorporated into a SIM. In this case, for example, regardless of presence or absence of a management device, pieces of confidential information such as a password and an encryption key are stored in a secret are in a memory area of a CPU of a mobile terminal or a SIM so as to carry out the communication processing in accordance with the present invention. By virtue of this, communications between devices can be achieved with high confidentiality by simply relying on the mobile terminal and dedicated software.

Also, the "management device" is connected to the network as needed and mediates at least a part of data transmitted and received between the communications devices. The "management device" is provided by a provider of the services of this communications system and encompasses, for example, an EPROM unit incorporated in a concealed area of an AT compatible machine, dedicated communication equipment, PC, smart phone, and tablet terminal having a communication function, an IC card and a SIM to be attached to these pieces of equipment. Multiple "management devices" may be installed in accordance with the traffic amount of the lines by the provider of the services of this communications system, installed as a dedicated system or systems for a specific group or groups, or may be installed in foreign countries as well as domestic areas.

The information terminal 7 includes a network interface (not shown) supporting the above-described general-purpose communication protocols, where a private IP is assigned to the network interface. The information terminal 7 is capable of communications with the communications device 2 via the internal network 6 and also capable of performing communications with the external network 1 via the internal network 6, the communications device 2, and the router 4. In other words, the information terminal 7 performs communications with the external network 1 always via the communications device 2 or always by referring to the communications device 2.

The router 4 includes an inbound network interface (not shown) supporting the above-described general-purpose communication protocols, where a static private IP is assigned to the inbound network interface, and configured to be connected to the internal network 6 and an inbound outbound network interface (not shown) supporting the above-described general-purpose communication protocols, where a static or dynamic global IP is assigned to the inbound outbound network interface, and configured to be connected to the external network 1. The communications device 2 and the information terminal 7 which are located on the side of the internal network 6 when viewed from the router 4 is allowed to perform mutual communications with the side of the external network 1 by IP masquerade of this router 4.

The management device 3 is connected to the external network 1 via the router 8 in the same manner as the communications device 2. The configuration of the router 8 is the same or substantially the same as that of the router 4. The details of the configuration of the management device 3 will be described later.

In this communications system, exchange of data (target data) is carried out between the information terminal 7 located in one internal network 6 and the information terminal 7 located in another internal network 6 via the external network 1.

Specifically, the transmitting-side information terminal 7A (see FIG. 15) which is the one information terminal 7 sends the target data via the external network 1 to the receiving-side information terminal 7B (see FIG. 15) which is the other information terminal 7. The processing procedure (steps) of the communications system at the time of the sending is briefly described. First, the transmitting-side information terminal 7A delivers the target data to the transmitting-side communications device 2A (see FIG. 15), which is the communications device 2 on the side of the internal network 6, via the internal network 6 in which the transmitting-side information terminal 7A is located. The transmitting-side communications device 2A transmits the target data via the external network 1 to the receiving-side communications device 2B (see FIG. 15) which is the communications device 2 on the side of the internal network 6 in which the receiving-side information terminal 7B is located. The receiving-side communications device 2B distributes the received target data to the above-described receiving-side information terminal 7B located in the internal network 6 to which the receiving-side communications device 2B is directly connected.

According to this processing procedure, by ensuring the security between the above-described two communications devices 2A, 2B, it is made possible to ensure the safety of the exchange of the target data and, when the exchange of data between the information terminals 7A, 7B and the communications devices 2A, 2B is allowed to be smoothly carried out, the overall usability will also be sufficiently ensured.

Incidentally, it is also possible to cause the respective communications devices 2 illustrated in FIG. 1 to function as the transmitting-side communications device 2A and function as the receiving-side communications device 2B. As a result, each information terminal 7 illustrated in the same figure may act as the transmitting-side information terminal 7A and also act as the receiving-side information terminal 7B.

It should be noted that, when the two communications devices 2, 2 carry out mutual communications via the external network 1, multiple communication channels may be provided between them such that the above-described mutual communications can be carried out using other communication channel(s) even when failure occurs in one communication channel. For example, in the example illustrated in FIG. 1, multiple routers 4 are provided for one communications device 2 as indicated by the virtual lines so as to form multiple communication channels.

Also, in the example illustrated in FIG. 1, the routers 4 are provided independently of the communications devices 2, but the routers 4 may be omitted and the communications devices 2 as such may have the router functionality. This also applies in the context of the relationship between the management device 3 and the router 8, so that the router 8 can be omitted.

Next, the configuration of the communications device 2 is described in detail on the basis of FIGS. 2 to 12.

Figure 2:
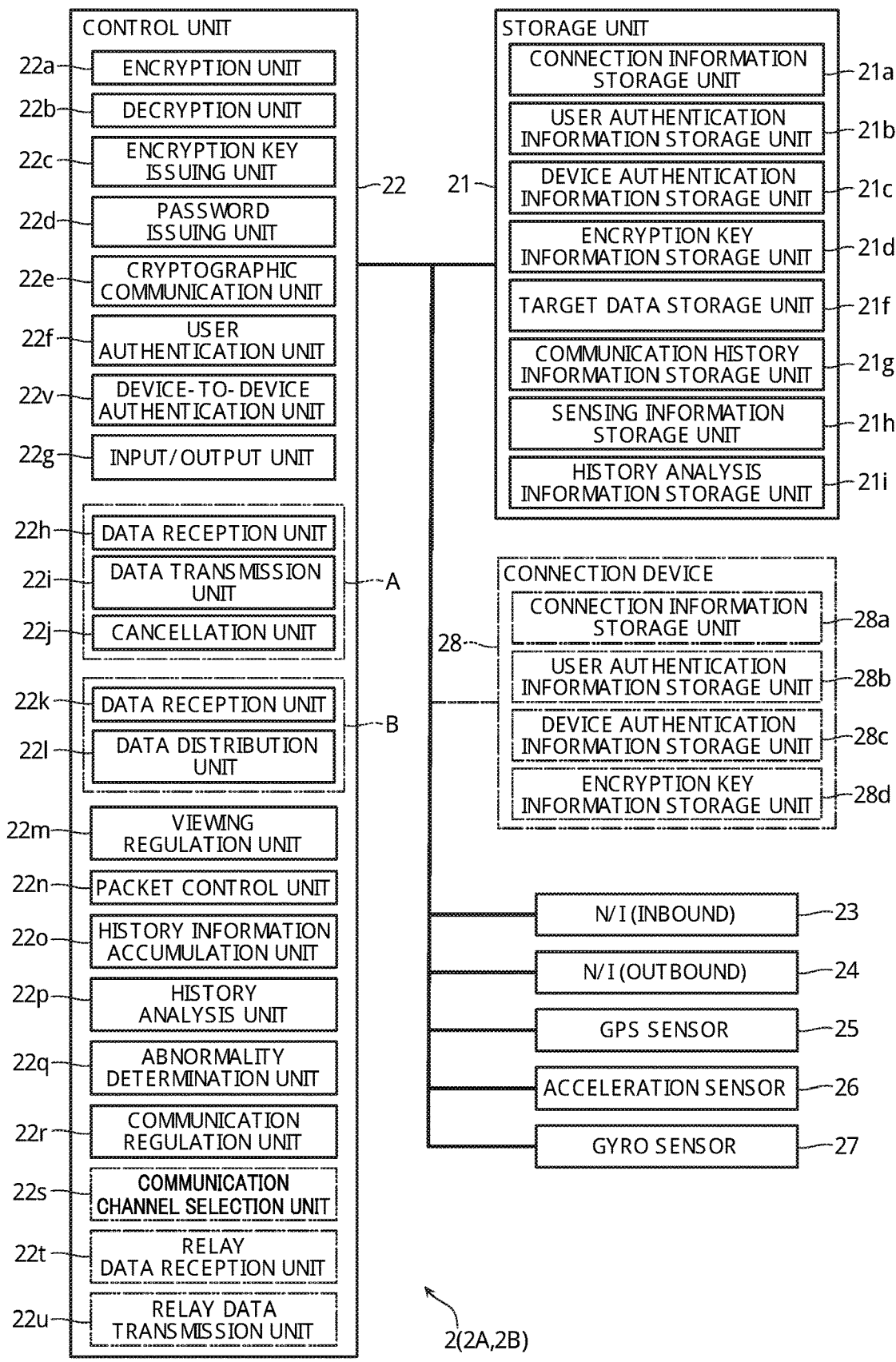
FIG. 2 is an explanatory diagram illustrating a configuration of a communications device.

FIG. 2 is an explanatory diagram that illustrates the configuration of the communications device 2. The communications device 2 includes a storage unit 21 constituted by the secret area in the memory area in the CPU, a RAM (random access memory) unit, a ROM (read-only memory) unit, an HDD (hard disk drive), an SSD (solid state drive), and the like and configured to temporarily or permanently store various pieces of information; a control unit 22 constituted by the CPU, RAM, SSD, etc. and configured to execute various programs; an inbound network interface (communications unit) 23 connected to the internal network 6; an outbound network interface (communications unit) 24 connected to the external network 1 side (specifically, the router 4); a GPS sensor (state detection sensor, position acquisition sensor) 25, which is a position acquisition unit configured to acquire position information of the communications device 2; an acceleration sensor (state detection sensor) 26, which is a load detection unit configured to detect a load acting upon the communications device 2; and a gyro Sensor (state detection sensor) 27 which is an attitude detection unit configured to detect an attitude of the communications device 2.

A private IP for the internal network 6 is assigned to the above-described inbound network interface 23.

When the router 4 exists, a global IP or a private IP for connection to the router 4 is assigned to the outbound network interface 24 of the communications device 2. Meanwhile, as described above, when the router 4 is omitted, a global IP for connection the communications device 2 directly to the external network 1 is assigned to the outbound network interface 24 of the communications device 2.

Incidentally, when the router 4 is provided, the communications device 2 in normal cases is placed in a state where it is segregated from the external network 1, so that the one communications device 2 cannot access the other communications device 2 via the global network 1. In order to allow the access, a transfer setting (port forward setting) is made to the router 4 in advance such that, when the router 4 has received a communication packet that specifies the communication port to be used by this communications system, the communication packet is transferred from the router 4 to the communications device 2 located in it.

Specifically, when one communications device 2 accesses the other communications device 2 via the router 4 and the other communications device 2 is located inside of the router 4, then the one communications device 2 needs to hold (store) the connection information for connection to the router 4 (specifically, the global IP, etc. of the router 4) as the connection information for connection to the other communications device 2.

Meanwhile, when the router 4 does not exist, the one communications device 2 needs to hold the connection information for connection to the outbound network interface 24 of the other communications device 2 as the connection information for connection to the other communications device 2. Incidentally, the communication port number is in normal cases used in a shared manner among the respective communications devices 2, so that is not necessary to be aware of it in situations other than the setting for the router 4.

The above-described storage unit 21 includes a connection information storage unit 21a configured to store connection information for connection to another or a plurality of other communications devices 2 and connection information for connection to the management device 3; a user authentication information storage unit 21b configured to store pieces of user authentication information such as a user ID, a password or its hash data, and the like of a user for whom access from the information terminal 7 to the communications device 2 is permitted or may be permitted; a device authentication information storage unit 21c configured to store the device authentication list listing the pieces of device authentication information needed in the authentication of the other communications device 2 and the management device 3 which may perform mutual communications with high confidentiality via the global network 1 for all the communications devices in the same group; an encryption key information storage unit 21d configured to store an encryption key or trigger information triggering generation of the encryption key and the like at the time of the device-to-device authentication and exchange of the target data; a target data storage unit 21f configured to sequentially store at least part of the target data transmitted by the transmitting-side communications device 2A or the target data received by the receiving-side communications device 2B; a communication history information storage unit 21g configured to sequentially store the pieces of information (communication history information) on the communication history of the communications by the two network interfaces 23, 24; a sensing information storage unit 21h configured to sequentially store pieces of sensing information (sensing result) obtained by the respective state detection sensors 25, 26, 27; and a history analysis information storage unit 21i configured to sequentially store results of analysis of the communication history information, the sensing information, and the like as history analysis information.

It should be noted that amongst these pieces of information, in particular, for the ID, the password (including hashed data) and the encryption key or the trigger information triggering generation of the encryption key which have high confidentiality, multiple sets thereof may be created in advance such that any one of them is switched by the switch header. Also, the user authentication information storage unit 21b, the device authentication information storage unit 21c, the encryption key information storage unit 21d, and the like which stores these pieces of information are provided in particular in a memory area that cannot be accessed from outside, e.g., the secret area in the memory area in the CPU.

Figure 3:
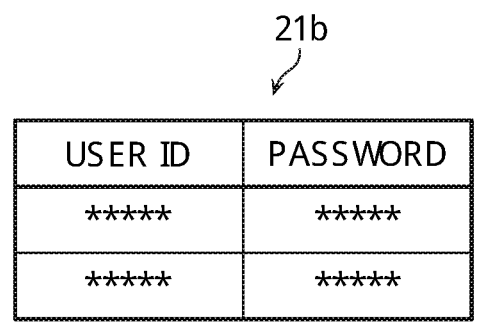
FIG. 3 is a diagram illustrating a data structure of a user authentication information storage unit.

FIG. 3 is a diagram that illustrates the data structure of the user authentication information stored in the user authentication information storage unit 21b. The user authentication information is constituted by the user ID and the password specified via the information terminal 7. It should be noted that the password may be stored as hashed data. In this example, two information terminals 7 are connected to one communications device 2 via the internal network 6, so that two pairs of the user authentication information are stored.

FIGS. 4 to 7 are diagrams that illustrate the data structure of the device authentication list of the device authentication information stored in the device authentication information storage unit 21c. The device authentication list is stored as the same information for all of the communications device 2 and the management device 3. In the example illustrated in the same figure, the device authentication information storage unit 21c is a data table conforming to relational database of high utility such as Oracle (™) and MySQL (™), etc.

The device authentication list stored in the device authentication information storage unit 21c lists the pieces of device authentication information needed in the authentication of the respective communications devices 2 and the management device 3 for all of the communications devices 2 of the same group and the management device 3.

The device authentication list 21c1 illustrated in FIG. 4 has, as its fields, "Device ID" which indicates the initial ID, "Surname" for storing the surname of the user, "Name" for storing the name of the user, "E-Mail" for storing the e-mail address of the user, "Privilege" for storing the privilege as a general user or an administrator, "Organization" for storing the company ID (organization ID) of the company the user works with, "State" for storing the state of the user (in this example, either of valid and invalid states), and "Update Date/Time" for storing the date (and time) on which the information of the user was updated.

Incidentally, the above-described e-mail address may be used as an ID when the user receives the device-to-device authentication. Also, basically a real name is entered as the "Name" and the "Surname" stored in the device authentication information storage unit 21c but an abbreviated name derived from a project, a nickname, an online name, etc. of an individual may be entered in view of security for making it more difficult to identify the individual. In this case, a field that corresponds to such a name is provided.

FIG. 5 is a diagram that illustrates the data structure of the device authentication list 21c2. The device authentication list 21c2 has, as its fields, "Device ID" which is an initial ID, "Switch Header" for switching passwords, "Password," and "PW Hash Data." Since particularly high confidentiality is required for the device authentication list 21c2, dozens to hundreds of pairs of a password and its hash data are provided for one device ID, and one pair to be used is switched at a predetermined timing by the switch header. By the device ID, a many-to-one relationship with the device authentication list 21c1 is defined in the device authentication list 21c2.

FIG. 6 is a diagram that illustrates the data structure of the company information which is the device authentication list 21c3. In the example illustrated in the same figure, the company information has, as its fields, "Company ID (Organization ID)" which is an initial ID and "Company Name" for storing the company name of the company ("Organization Name" for storing the organization name of the organization). Incidentally, the above-described device authentication list 21c1 has, as its field, a company ID which is the initial ID of this company information, and the device authentication list 21c1 and the device authentication list 21c3 have a many-to-one relationship. It should be noted that an abbreviated name derived from a project, a nickname, an online name, etc. of the company may be entered in the "Company Name" of the device authentication list 21c3, in the same manner as the individual name ("Surname" and "Name") of the device authentication list 21c1 in view of security for making it more difficult to identify the actual company.

Figure 7:
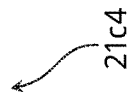
FIG. 7 is a diagram illustrating the data structure of the device authentication information storage unit.

FIG. 7 is a diagram that illustrates the data structure of the group information which is the device authentication list 21c4. The group information has, as its fields, "Group ID" which is an initial ID, "Group Name" indicating the name of the group, "Member 1," "Member 2," . . . "Member n" for storing the device IDs of the users belonging to this group, and "Update Date/Time" for storing the date (and the time) on which the information on this group was updated.

It is necessary to define an appropriate (i.e., not too small or not too large) number as the number of users that can be registered in each group (e.g., "n" in the example illustrated in FIG. 7), for it is defined when the data structure is decided on. Also, the group information has the fields of "Device ID," which is the initial ID of the device authentication list 21c1, because the information on each user to be registered in the group is to be acquired from the device authentication list 21c1, by virtue of which a many-to-one relationship is defined between the device authentication list 21c4 and the device authentication list 21c1.

FIG. 8 is a diagram that illustrates the data structure of the encryption key information stored in the encryption key information storage unit 21d. The section (a) in the same figure illustrates the common key information 21d1. Several dozen to several hundred types of common keys are provided in advance in the common key information 21d1, amongst which one common key is selected by the switch header to be used. It should be noted that, in this example, the common key is common to all of the communications devices 2 and the management device 3, but different common keys may be provided for each of the unit of management such as each party of the communications, or area and section in the same group. In this case, the types of the common keys to be provided increase, but the risk at the time of possible theft of the common key can be lowered.

The section (b) of the same figure illustrates the private key/public key information 21d2. Several dozen to several hundred types of private keys/public keys are provided in advance in the private key/public key information 21d2, amongst which a certain pair is selected by the switch header to be used. The section (c) of the same figure illustrates the public key information 21d3 of the respective communications devices 2 and the management device 3. In the public key information 21*d*3, several dozen to several hundred types of public keys are provided in advance for each device ID, one of which is selected by the switch header to be used. It should be noted that, with regard to the common key information 21*d*1 and the public key information 21*d*3 for each of the communications devices 2 and the management device 3, the common information is stored for all of the communications devices 2 and the management device 3 while the private key/public key information 21*d*2 is only stored in this communications device 2 or the management device 3. Meanwhile, the public key thereof is stored in the location corresponding to the own device ID of the public key information 21*d*3 for each of the communications devices 2 and the management device 3.

FIG. 9 is a list of the data structure of the target data storage unit. The target data storage unit 21*f* has, as its fields, "Data ID" which is an initial ID, "Subject" for storing the subject name of the target data, "Confidentiality Level" indicative of the confidentiality level of the target data in multiple levels, "Viewing Period" indicating the period during which the target data is allowed to be viewed by a start point and an end point, "Allowable Viewing Counts" for storing the number of times for which the target data is allowed to be viewed, "Viewing Counts" for storing the number of times for which the user that has received the target data is allowed to view it on its own information terminal 7 at the time of the reception of it, where the number of times is stored in the form of a number of times remaining, "Sender" for storing the device ID of the user that has transmitted the target data, "Recipient" for storing the device ID of the user receiving the target data, "Comment" for storing the comment from the sender included in the target data, "Data Storing Location" for storing the information on the location of data storage to store the body of data of the target data (e.g., image file and video file, etc.), and "Transmission Date/Time" for storing the date (and time) on which the target data was transmitted.

The above-described confidentiality level is specified by three levels of, in the illustrated example, "Personal" (0) indicative of a low confidentiality level, "Important" (1) indicative of an intermediate confidentiality level, and "Confidential" (2) indicative of a high confidentiality level." The start point of the above-described viewing period always is specified as a date and time at or after the above-described date and time of transmission. Of course, the start point can also be specified as a date and time after a lapse of a predetermined period of time following the date and time of transmission. The above-described number of allowable times of viewing can be specified within the range of one time to infinite (in the illustrated example, two levels of only once and unlimited).

Also, the target data storage unit 21*f* has, as its field, the "Device ID" field which is the initial ID of the device authentication information storage unit 21*c* so as to acquire the information of the user acting as the sender and the information of the user acting as the recipient from the device authentication information storage unit 21*c*. As a result, the target data storage unit 21*f* and the device authentication information storage unit 21*c* have a many-to-one relationship.

Incidentally, when a user (sender) belonging to a certain group designates a single or multiple users as a recipient or recipients (destination) from among multiple users belonging to this group, pieces of data having the respective fields of the target data storage unit 21*f* are provided for each recipient and stored in the target data storage unit 21*f*.

Also, with regard to the target data storage unit 21*f*, in the context of the transmission and reception of the target data, the same data is individually stored in the storage unit 21 of the transmitting-side communications device 2A and the storage unit 21 of the receiving-side communications device 2B. Also, the target data whose end point of the viewing period has been reached may be deleted from the target data storage unit 21*f* of the storage units 21, 21 of the transmitting-side communications device 2A or the receiving-side communications device 2B.

As illustrated in FIG. 2, the above-described control unit 22 realizes the various functions by programs that run on the OS. The OS may be a general-purpose operating system such as Windows® and Linux® or may be a proprietary dedicated OS, and alternatively multiple operating systems may be used in combination (e.g., one general-purpose OS and one dedicated OS). When multiple operating systems are used in combination, a dual-boot scheme may be used or a scheme may be used according to which one operating system runs on the other operating system in a virtual manner. In this example, Linux or the like which is a single open-source general-purpose OS is used.

The control unit 22 includes: an encryption unit 22*a* configured to perform encryption of data to generate an encrypted text; a decryption unit 22*b* configured to decrypt the encrypted text that has been encrypted by the encryption unit 22*a* of the other communications device 2 to generate a plain text; an encryption key issuing unit 22*c* that provides an encryption key such as common key, private key, and public key for encryption and decryption; a password issuing unit 22*d* that provides a password for use in encryption, decryption, user authentication, or the like; a cryptographic communication unit 22*e* configured to perform cryptographic communications between the communications devices 2, 2 or between the communications device 2 and the management device 3; a user authentication unit 22*f* configured to perform user authentication to authenticate a user making an access to the communications device 2 by the information terminal 7; a device-to-device authentication unit 22*v* configured to perform device-to-device authentication between the communications device 2 and the other communications device 2 or the management device 3; an input/output unit 22*g* such as a web server providing a user interface such as a GUI (graphical user interface) for the information terminal 7 connected via the internal network 6 on the side where the communications device 2 is located; a data reception unit 22*h* configured to receive the target data from the information terminal 7; a data transmission unit 22*i* configured to transmit the relevant receiving-side communications device 2B the target data that has been received by the data reception unit 22*h* and encrypted by the encryption unit 22*a*; a cancellation unit 22*j* configured to cancel exchange of the target data between the transmitting-side information terminal 7A and the receiving-side information terminal 7B; a data reception unit 22*k* on the side of the receiving-side information terminal 7B configured to receive the target data from the transmitting-side communications device 2A; a data distribution unit 22*l* configured to distribute to the relevant receiving-side information terminal 7B the target data that has been received by the data reception unit 22*k* and decrypted by the decryption unit 22*b*; a viewing regulation unit 22*m* configured to regulate the distribution of the target data by the data distribution unit 22*l* on the basis of the information included in the target data (transmission data) such as the viewing period and the number of times of viewing; a packet control unit 22*n* configured to control the communication (packet) via at least either of the two network interfaces 23, 24; a history information accumulation unit 22o configured to sequentially store and accumulate the pieces of the communication history information from the two communication interfaces 23,24 in the above-described communication history information storage unit 21g and sequentially store and accumulate the sensing information (sensing result) from the respective state detection sensors 25, 26, 27 in the above-described sensing information storage unit 21h; a history analysis unit 22p configured to analyze the history information such as the communication history information and sensing information stored in the storage unit 21 and store the result of the analysis into the history analysis information storage unit 21i of the storage unit 21 as the above-described history analysis information; an abnormality determination unit 22q configured to determine various abnormalities of the communications device 2 on the basis of the history information and the history analysis information; and a communication regulation unit 22r configured to regulate communications (specifically, for example, prohibit the communications and limit the area where communications are allowed) via the communications device 2 when it has been determined by the abnormality determination unit 22q that an abnormality occurred.

Further, the control unit 22 may include a communication channel selection unit 22s configured to select one communication channel from among multiple communication channels between the communications devices 2, 2 and the communication channels between the communications device 2 and the management device 3 if such multiple communication channels exist.

Also, when the communication channel selection unit 22s performs communications with other communication partner that is not a user in the group, then the communication channel selection unit 22s may perform the communications using a GUI corresponding to the communication partner. When the communication with a user out of the group with which communications are performed should be allowed in accordance with the confidentiality level of the data to be transmitted and received, then the communication channel selection unit 22s can be made to function such that it selects the data transmission and reception on a normal communication channel on which the communications device 2 and the management device 3 do not reside in accordance with the IP address of the destination.

The above-described encryption unit 22a is configured to encrypt target data or various pieces of information exchanged between the other communications devices 2, 2 using a predetermined algorithm. Also, in encryption of the target data, encryption strength is changed in accordance with the confidentiality level ("confidentiality level" of the target data storage unit 21f) specified for the same target data. The encryption may be performed for multiple rounds with different algorithms or different encryption keys. Also, it is also possible to use scramble processing as appropriate to split data into multiple split data pieces, modify the order of the split data pieces, and encrypt the respective split data pieces. At this point, encryption for the respective slit data pieces may be done as one round of encryption process or as multiple encryption processes. Further, different algorithms and different encryption keys may be used in different number of encryption processes depending on the split data pieces.

The above-described decryption unit 22b decrypts the encrypted text that has been encrypted by the encryption unit 22a of the other communications device 2 using a predetermined algorithm corresponding to the algorithm of the encryption of the encryption unit 22a.

Figure 10:
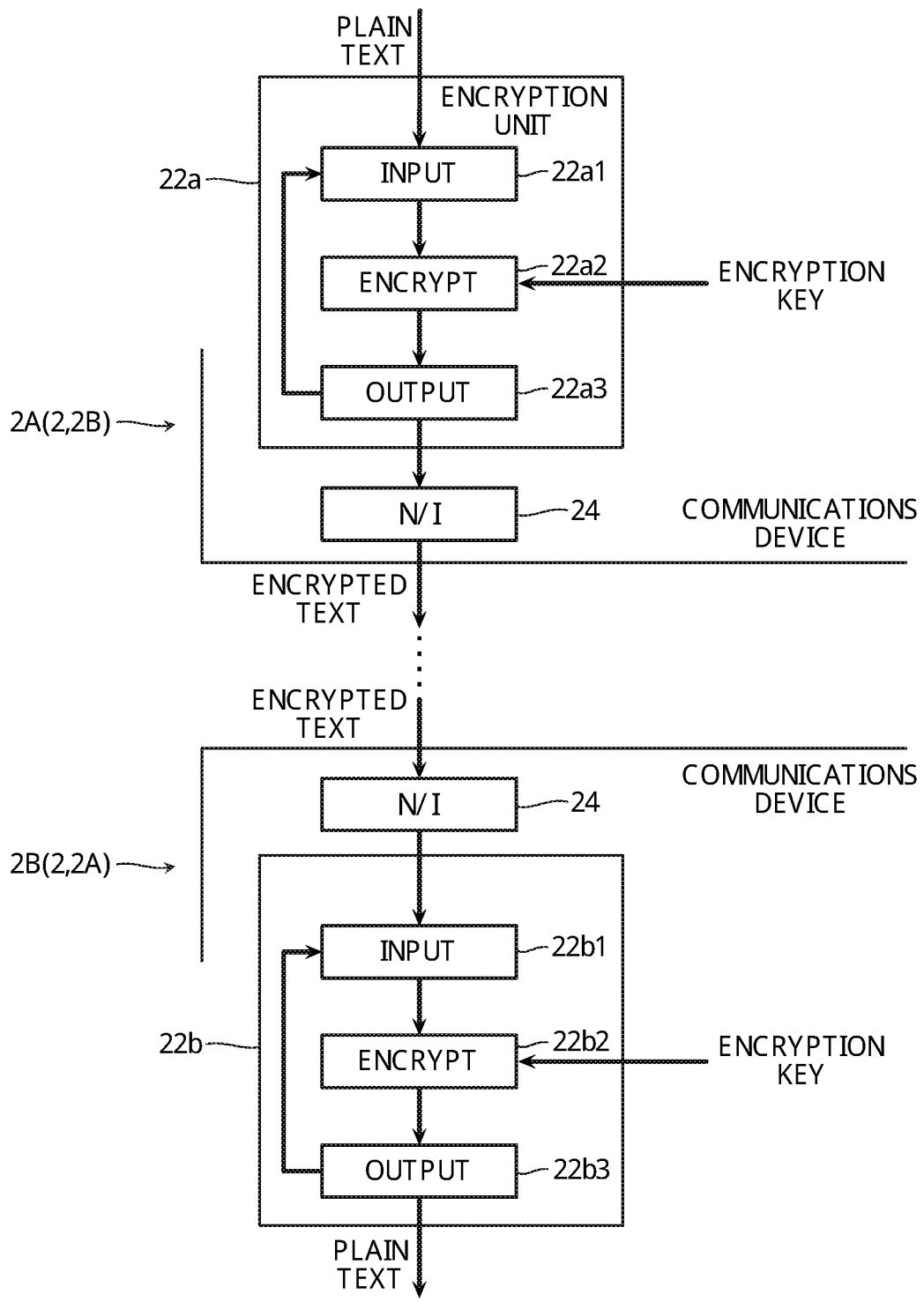
FIG. 10 is a conceptual diagram conceptually illustrating a configuration of an encryption unit and a configuration of a decryption unit.

FIG. 10 is a conceptual diagram that conceptually illustrates the configurations of the encryption unit and the decryption unit. The encryption unit 22a includes: an input unit 22a1 configured to accept an input of a plain text (e.g., target data, etc.); an encryption unit 22a2 configured to encrypt the plain text that has been input by the input unit 22a1; and an output unit 22a3 configured to output the encrypted text (e.g., target data, etc.) that has been encrypted by the encryption unit 22a2. Incidentally, in the encryption by the encryption unit 22a2, an encryption key that includes information on the encryption is provided for the encryption unit 22a2 from the above-described encryption key information storage unit 21d of the communications device 2 or by the encryption key issuing unit 22c.

Meanwhile, the decryption unit 22b includes: an input unit 22b1 configured to accept an input of an encrypted text (e.g., target data, etc.); a decryption unit 22b2 configured to decrypt the encrypted text that has been input by the input unit 22b1; and an output unit 22b3 configured to output the plain text (e.g., target data, etc.) that has been decrypted by the decryption unit 22b2.

It is necessary that the encryption key provided for the encryption unit 22a2 and the encryption key provided for the decryption unit 22b2 are the same or corresponding encryption key and, specifically, they will be a combination of the same common keys or a combination of a corresponding private key and a corresponding public key.

For example, the encrypted text that has been encrypted by the encryption unit 22a of the transmitting-side communications device 2A is transmitted via the outbound network interface 24 of the transmitting-side communications device 2A to the receiving-side communications device 2B. The receiving-side communications device 2B receives the encrypted text by the outbound network interface 24 of the receiving-side communications device 2B, decrypts it by the decryption unit 22b of the receiving-side communications device 2B, and obtains a readable plain text.

At this point, it is necessary that the encryption key used by one of these two communications devices 2A, 2B and the encryption key used by the other of them be the same or corresponding keys and, for example, a combination of two common keys or a combination of a private key and a public key corresponding to the same private key may be contemplated. In this communications system, multiple pairs of the same or corresponding encryption keys are stored in advance in the storage units 21, 21 of these two communications devices 2A, 2B respectively, and thus it is made possible to carry out communications in an encrypted environment immediately after the installation of the communications devices 2A, 2B. It should be noted that, when the common key is used as the encryption key, a password or other trigger information used in generation of the common key may be stored in advance in the storage units 21, 21 of the respective communications devices 2A, 2B in place of the common key as such. In this case, the common key should be generated using the same algorithm at the same timing by the respective communications devices 2A, 2B and the management device 3.

Also, encryption by the encryption unit 22a may be performed by multiple rounds for the same piece of data with the encryption key changed for each round of encryption, in which case the encrypted text that has been output from the output unit 22a3 is sent back to the input unit 22a1. Meanwhile, in response to this, the decryption unit 22b is also capable of sending the data that has been output from the output unit 22b3 back to the input unit 22b1. In addition, the decryption unit 22b uses the encryption key that is same with or corresponding to the encryption keys that were used in the encryption for the same piece of data that had been encrypted for multiple rounds in an inverted order which is inverted from that in the encryption to decrypt the piece of data by the same rounds, and thus the original plain text is allowed to be obtained. Further, the decryption unit 22b may have "temporary decryption mode" to function such that the piece of data is automatically encrypted again upon completion of viewing and operations after the decryption.

The common key, public key, and private key used in the encryption and decryption are stored in the encryption key information storage unit 21d as described above to be read and used as appropriate. However, it may be generated independently by the encryption key issuing unit 22c and used. The above-described encryption key issuing unit 22c is also capable of providing the generated encryption key to the encryption unit 22a or the decryption unit 22b or storing it in the storage unit 21.

Figure 11:
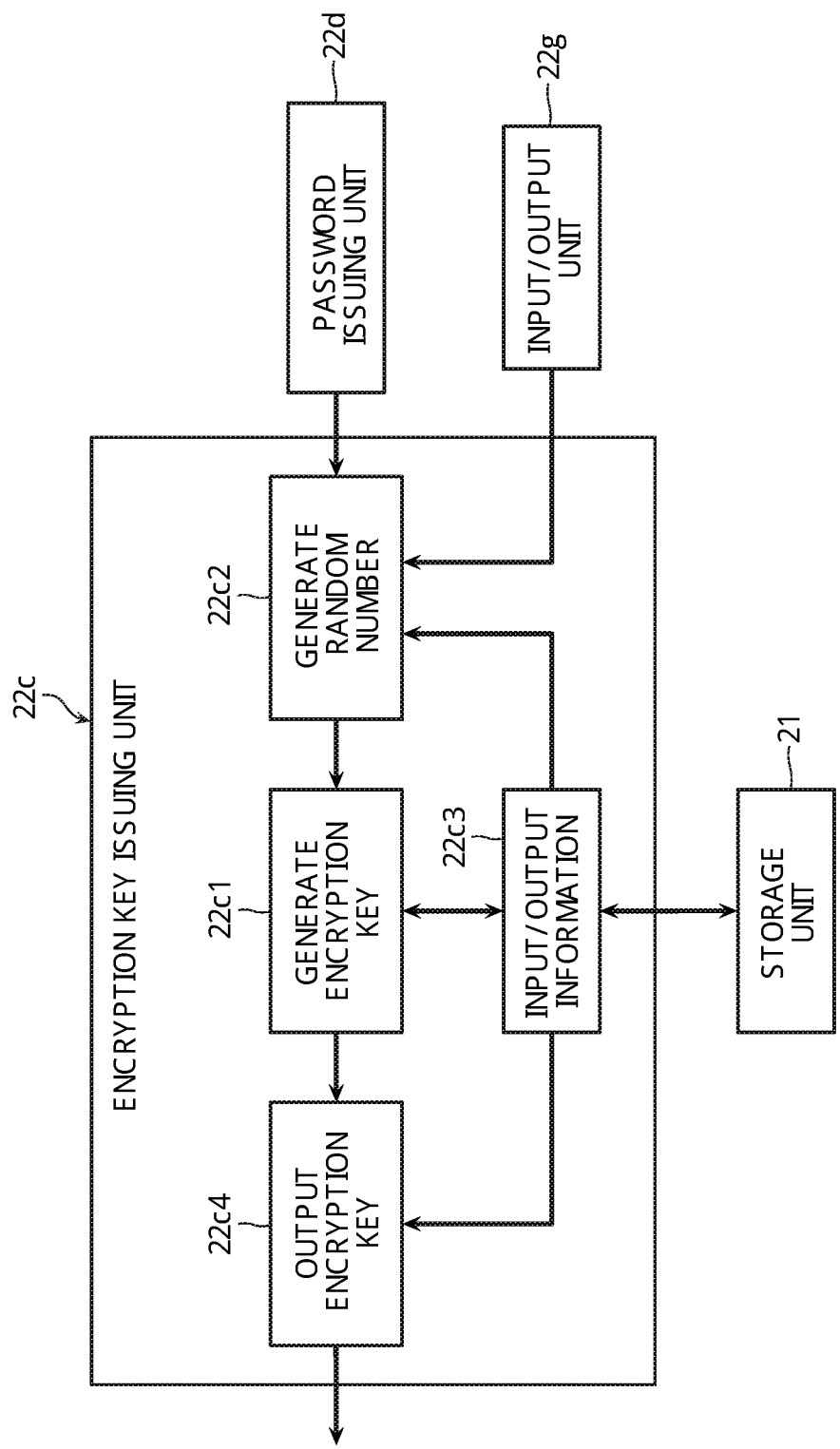
FIG. 11 is a conceptual diagram conceptually illustrating a configuration of an encryption key issuing unit.

FIG. 11 is a conceptual diagram that conceptually illustrates the configuration of the encryption key issuing unit 22c. The encryption key issuing unit 22c includes: an encryption key generation unit 22c1 configured to generate an encryption key; a random number generation unit 22c2 configured to generate a true random number or a pseudorandom number for use in generation of the encryption key; an information input and output unit 22c3 configured to perform input and output of information to and from the storage unit 21; and an encryption key output unit 22c4 configured to output the encryption key to be used by the encryption unit 22a and the decryption unit 22b.

The random number generation unit 22c2 is configured to generate the true random number using uncertain information (e.g., the timing of pressing a keyboard, etc.) that is input via the input/output unit 22g or the like or generate the pseudorandom number using a password or any other definite trigger information. Incidentally, when the true random number is to be generated, a radon pulse generation device or the like may be used. The password is provided from the password issuing unit 22d to the random number generation unit 22c2. The other definite trigger information is output via the information input and output unit 22c3 from the secret area of the storage unit 21 to the random number generation unit 22c2. Incidentally, when a pseudorandom number is to be generated, a traditionally known scheme such as LFSR (linear feedback shift register) is used.

The encryption key generation unit 22c1 is configured to generate the encryption key on the basis of the random number from the random number generation unit 22c2 or the trigger information that has been acquired from the secret area of the storage unit 21 via the information input and output unit 22c3.

The encryption key output unit 22c4 is configured to output the encryption key that has been generated by the encryption key generation unit 22c1 or the encryption key that has been acquired from the storage unit 21 via the information input and output unit 22c3. Meanwhile, the encryption key that has been generated by the encryption key generation unit 22c1 can be stored in the secret area of the storage unit 21 via the information input and output unit 22c3.

The above-described password issuing unit 22d is configured to provide a password (or information of the password) used in user authentication, authentication between the communications devices 2, 2 for encrypted communication, authentication between the communications device 2 and the management device 3, generation of the above-described encryption key, and the like.

Figure 12:
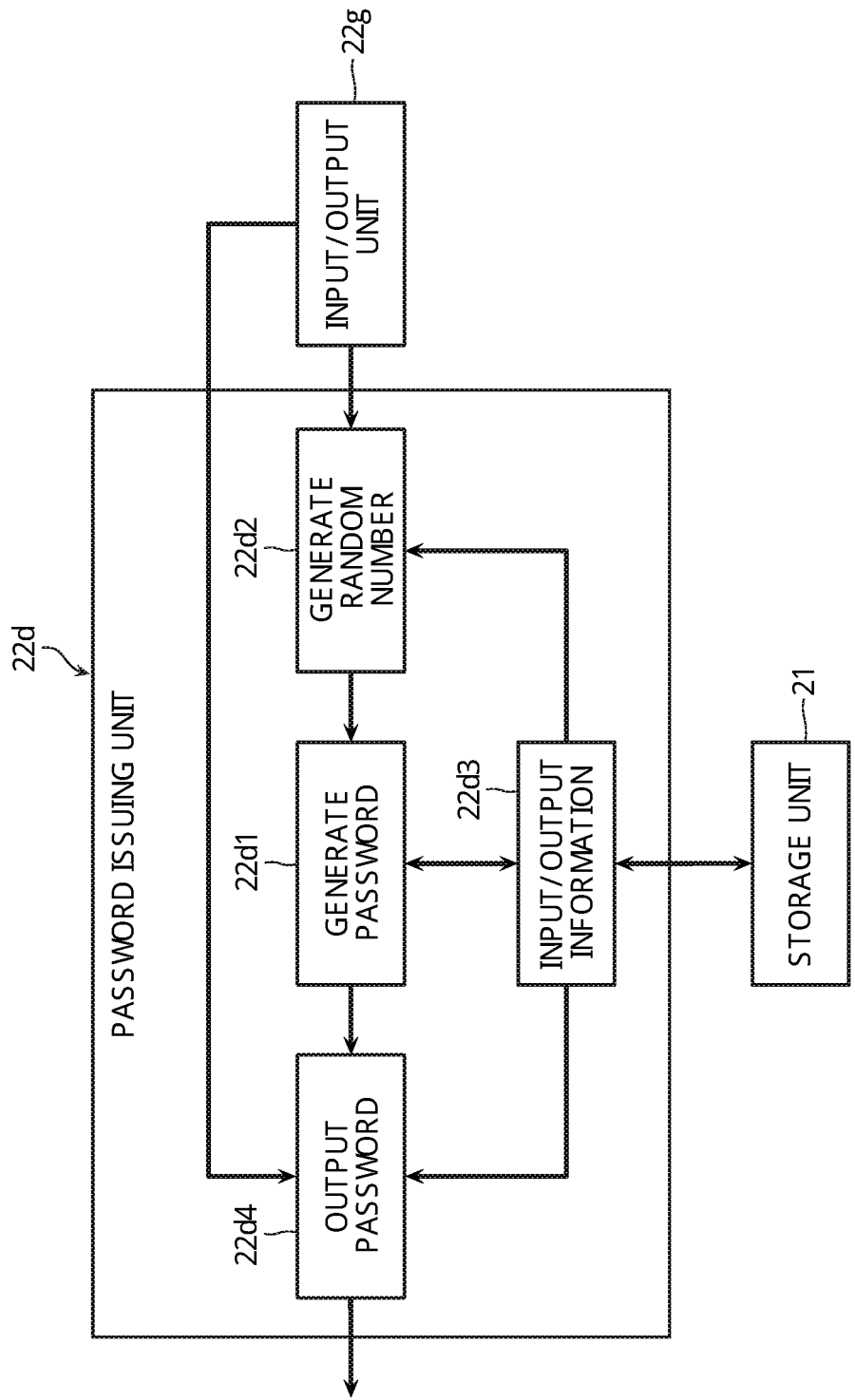
FIG. 12 is a conceptual diagram conceptually illustrating a configuration of a password issuing unit.

FIG. 12 is a conceptual diagram that conceptually illustrates the configuration of the password issuing unit 22d. The password issuing unit 22d includes: a password generation unit 22d1 configured to generate a password; a random number generation unit 22d2 configured to generate a true random number or a pseudorandom number used in generation of the password; an information input and output unit 22d3 configured to perform input and output of information to and from the storage unit 21; and a password output unit 22d4 configured to output the information of the password.

The random number generation unit 22d2 is configured to generate a true random number using uncertain information (e.g., the timing of pressing a keyboard, etc.) that is input via the input/output unit 22g or the like or generate a pseudorandom number using definite trigger information. Also, in the generation of the true random number as well, a radon pulse generation device or the like may be used in the same manner as in the above-described case. The trigger information is acquired from the secret area of the storage unit 21 via the information input and output unit 22d3.

Incidentally, since a pseudorandom number is generated with a certain degree of periodicity, it is also possible to introduce the concept of one-time password in generation of the pseudorandom number between the two communications devices 2, 2 and the one-time password is allowed to be used in the user authentication, encryption of communications, authentication between the communications devices 2, 2, authentication between the communications device 2 and the management device 3, and the like. It should be noted that when a one-time password is to be used in the user authentication as an example, a token may be given to the user and the password may be generated by the token. Meanwhile, in this case, it is desirable that check data (correction signal) is also included so that synchronization can be corrected during the operation. For example, correction in the case where the synchronized processes fail to be synchronized may be performed using a check digit or the like used for the purpose of detecting a code error or the like.

The password generation unit 22d1 is configured to generate a password on the basis of the random number that has been generated by the random number generation unit 22d2, the trigger information that has been acquired from the secret area of the storage unit 21 via the information input and output unit 22d3, or the like. The password that has been generated is delivered to the password output unit 22d4 or stored in the secret area of the storage unit 21 via the information input and output unit 22d3.

The password output unit 22d4 may receive the password from the password generation unit 22d1 and output the password, or may receive the password which a user inputs via the information terminal 7 directly from the input/output unit 22g, or may output the password that has been acquired from the secret area of the storage unit 21 via the information input and output unit 22d3. The password that has been output is output as needed to the respective units such as the input/output unit 22g and the encryption key issuing unit 22c.

Encrypted communications are performed between the communications device 2 and the other communications device 2 and between the communications device 2 and the management device 3 by the above-described cryptographic communication unit 22e as illustrated in FIG. 2. In other words, the communications between the communications devices 2, 2 (device-to-device communications) or the communications between the communications device 2 and the management device 3 (device-to-device communication) are encrypted by the cryptographic communication unit 22e. In this example, in the device-to-device communications, the devices are VPN-connected (device-to-device-connected) to each other using protocols based on IPSec (IP Security Architecture) and PPTP (Point-to-Point Tunneling Protocol) to establish secure communication channel by tunneling and encryption. While the encryption unit 22a and the decryption unit 22b are used in the encryption and the decryption at this point, the encryption and the decryption may be independently performed by the cryptographic communication unit 22e. Incidentally, the settings for performing the VPN connection are done in advance and do not need to be done at the time of the introduction.

The device authentication list, which is information for the authentication (device-to-device authentication) used in the encrypted communication, is stored in the device authentication information storage units 21c, 31c of the respective communications devices 2 and the management device 3. Since the device authentication list is specified at the time of shipment of the communications device 2 and stored in the storage unit 21 such that it cannot be accessed from outside, a secure scheme is implemented which ensures that leakage from a user does not occur in the operations. When the trigger information is to be used, the timing acting as the trigger such as the setting time or transmission operation may be specified and device authentication data may be generated on the basis of the trigger information.

Incidentally, between the parties performing the encrypted communications, they need to hold the same or corresponding device authentication list and the encryption key information, but such common pieces of information do not need to be held by the parties that do not perform the encrypted communication. In addition to this, the connection information to connect to the other communications device 2 and the management device 3 with which exchange of data may take place is stored in advance in the connection information storage unit 21a of the storage unit 21 and does not need to be specified again at the time of the introduction of the communications device 2.

The above-described user authentication unit 22f performs the user authentication for the user requesting access (login) to the communications device 2 using the information terminal 7 on the basis of the information stored in the user authentication information storage unit 21b of the storage unit 21 and determines whether or not the access should be permitted. Incidentally, in order to prevent "impersonation" caused by leakage of the ID and/or a password, the user authentication may be carried out using the one-time password as described above. Further, since leakage of the ID and/or the password may cause possible "impersonation," it is desirable that the personal authentication of users and the device-to-device authentication of the communications devices be carried out by multistage authentication combining multiple authentication schemes or a multifactor authentication scheme combining multiple factors. Further, the privileges of users and disclosure information disclosed to users may be added or modified every time one of the stages of the multistage authentication proceeds.

A sufficient number of or the maximum number of the pieces of user information are stored in advance in the device authentication information storage unit 21c as the provisional users and, when a new user is to be registered, the piece of information of one provisional user registered in the device authentication information storage unit 21c is modified and updated from the side of the management device 3 (further specifically, an information update unit 32h which will be described later). Incidentally, users to be authorized to make an access (login) by the device-to-device authentication unit 22v are limited to those whose "State" of the device authentication information 21c1 is set to "valid" (1). In addition, the information of the "State" is set to "invalid" (0) in the case of a provisional user. When it is changed from the side of the management device 3 to "valid" (1) so that a valid state is entered, the user in question will be allowed to use this communications system. Meanwhile, the switching between "valid" and "invalid" is not limited to these schemes.

Also, in the same manner as in the device authentication list 21c1, a sufficient number of or a maximum number of the pieces of information on the provisional companies are stored in advance in the device authentication list 21c2 which lists the pieces of company information. Also, in the same manner, a sufficient number of or a maximum number of the pieces of group information including information on the provisional group are stored in advance in the device authentication list 21c3 which is the group information. The content of these pieces of information is updated by the management device 3 (further specifically, an information update unit 32h which will be described later). Incidentally, the maximum number of the provisional users are registered in advance in the provisional group. The maximum number of the provisional users can be declared by a person in charge of management of groups at the time of the introduction or the number of provisional users that is specified in advance can be confirmed.

The above-described input/output unit 22g is configured to provide a GUI to the information terminal 7 of the user authorized to make an access and accepts the input from the information terminal 7. The input/output unit 22g is constituted by a web server or the like.

The above-described data reception unit 22h is configured to receive the target data from the transmitting-side information terminal 7A of the user via the input/output unit 22g. Incidentally, the user acting as the sender first selects one group using the transmitting-side information terminal 7 from one or more groups to which the user himself/herself belongs. At this point, one group may be selected for each purpose of communication. Subsequently, a user (recipient) or users (recipients) to which the user wants to send the target data is selected from this group, and the number of times and period of viewing by the recipient are determined, and the target data including these pieces of information is delivered to the transmitting-side communications device 2A.

In this manner, necessary information of the target data that has been received by the data reception unit 22h is stored in the target data storage unit 21f of the storage unit 21 of the transmitting-side communications device 2A and encrypted by the encryption unit 22a using the encryption key. Incidentally, the target data is generated individually for each user to which the target data should be sent or linked with the target data and, for example, if it is to be sent to three users, then three pieces of target data are generated or linked with the target data. In addition to this, at the time of the encryption of the target data, in accordance with the confidentiality level, the security strength is changed which is determined depending on the presence or absence of the encryption, the number of rounds of the encryption, and the like. It should be noted that since the communications as such are encrypted, if the confidentiality level is lowest, then it is also possible to omit the encryption of the target data as such.

The above-described data transmission unit 22*i* transmits the target data that has been encrypted by the encryption unit 22*a* to the receiving-side communications device 2B of the receiving-side information terminal 7B of the user designated as the destination. Incidentally, the transmission processing for transmitting target data by the data transmission unit 22*i* may be performed immediately or the transmission processing may be carried out after the lapse of the start point of the viewing period.

The above-described data reception unit 22*k* is configured to receive the target data from the transmitting-side communications device 2A.

In this manner, since the target data that has been received by the data reception unit 22*k* is an encrypted text that has been encrypted as described above, the target data is decrypted by the decryption unit 22*b* into a plain text. At the time of the decryption, the same or corresponding encryption key as that in the encryption is used for the decryption. Incidentally, the decryption will be able to be carried out promptly and accurately if the data reception unit 22*k* of the receiving-side communications device 2B receives the confidentiality level of the target data from the data transmission unit 22*i* of the transmitting-side communications device 2A. Meanwhile, it is not essential to exchange the information on the confidentiality level between the two communications devices 2A, 2B as long as the rule is defined in advance in accordance with the confidentiality level.

The necessary information in the target data which is now in the form of a plain text is stored in the target data storage unit 21*f* of the storage unit 21 of the receiving-side communications device 2B.

The above-described data distribution unit 22l distributes the target data to the receiving-side information terminal 7B in response to a request from the receiving-side information terminal 7B of the user specified as the recipient of the target data. It should be noted that the data distribution unit 22l may spontaneously carry out the distribution of the target data to the receiving-side information terminal 7B at a predetermined timing. Meanwhile, the distribution by the data distribution unit 22l is only allowed to be carried out when the viewing is not regulated (prohibited) by the viewing regulation unit 22*m*.

The above-described viewing regulation unit 22*m* regulates (prohibits) the distribution of the target data to the receiving-side information terminal 7B of the user specified as the recipient: if the number of times of viewing (remaining) of the target data is set to 0; if the current time is out of the viewing period; if number of times of viewing (remaining) during which viewing is prohibited by the sender is indicated by a symbol of prohibition such as x; if the system administrator of the management device 3 has received the application for prohibition of viewing from a person in charge of management of groups; or if the viewing is prohibit in view of the management of the system administrator. Incidentally, the start point and the end point are specified for the viewing period and the interval demarcated by the start point and the end point becomes the period during which viewing is possible. This start point can be specified at the time point at which the transmitting-side information terminal 7A delivers the data to the transmitting-side communications device 2A, or at the time point after a lapse of a predetermined period of time after the former time point. In the latter case, the recipient will be allowed to view the target data after the lapse of the above-described predetermined period of time after the sender transmitted the target data.

The above-described cancellation unit 22*j* performs the cancellation processing when a request for cancellation of the transmission (distribution) of the target data has been sent from the transmitting-side information terminal 7A, where the cancellation processing is performed on the side of the transmitting-side communications device 2A. Specifically, if the target data is yet to be transmitted by the data transmission unit 22*i* prior to the start point of the viewing period, then deletion of the target data stored in the storage unit 21 of the transmitting-side communications device 2A or cancellation of the transmission processing is performed, so that the distribution is canceled. On the other hand, if the target data has already been transmitted by the data transmission unit 22*i*, the target data stored in the storage unit 21 of the receiving-side communications device 2B is remotely deleted or the distribution processing as such of the target data on the side of the receiving-side communications device 2B is canceled, and thus the distribution is canceled. If a copy of the target data is created, the copied target data should be deleted as well.

It should be noted that at the time of the cancellation processing, whether or not the cancellation instruction is an authentic one may be determined using hash data or the like. Specifically, for example, a common hash program and a common key are held in a confidential state between the transmitting-side information terminal 7A and the receiving-side information terminal 7B. The transmitting-side information terminal 7A combines the cancellation instruction code and the common key with the cancellation instruction to hash it and then send it to the receiving-side information terminal 7B. The receiving-side information terminal 7B, upon reception of the cancellation instruction, combines the cancellation instruction code with the common key to hash them, and compares what has been hashed with the received hash value and, if they agree with each other, determines that the cancellation instruction code is not falsified and that the cancellation instruction has been legitimately issued by the transmitting-side information terminal 7A. Also, at this point, the user authentication may be performed again to confirm whether or not the cancellation instruction is the one that has been issued from a user having a correct authorization. Incidentally, as the user having the correct authorization (hereinafter simply referred to as "user"), for example, a user who actually transmitted the target data, a person in charge of management of groups, or a person in charge of group registration may be contemplated. When a person in charge of management of groups or a person in charge of group registration is to be registered, the system administrator needs to check if these persons in charge are the persons themselves registered using documentation of personal identity (a car driver's license with photo, etc.).

By the cancellation processing from the transmitting-side communications device 2A, it is made possible to respond to a case where erroneous target data has been distributed and thereby increases the usability. Incidentally, even when the current time is after the start point of the viewing period of the target data but actually the distribution thereof to the receiving-side information terminals 7B of the respective recipients has not been performed yet, then the distribution at issue can be cancelled by the similar processing. Incidentally, in order to enable this data erasure, a deletion flag or any other like element may be included in the data at the time of transmission thereof, and the deletion flag may be disabled in normal cases such that the data erasure takes place when it is taken out of the disabled state and enabled.

The above-described packet control unit 22n is configured to control the communications performed via the two network interfaces 23, 24.

For example, when the information terminal 7 located in the internal network 6 to which the communications device 2 pertains carries out the communication via the external network 1, then the communication always takes place via the communications device 2 in accordance with the above-described network configuration, so that the communication (packet) from the information terminal 7 passes through the communications device 2. The communication packet originating from the information terminal 7 and reaching the inbound network interface 23 is transferred via the outbound network interface 24 to the router 4, and then sent to the external network 1 by the router 4.

In other words, the communications device 2 is capable of acquiring not only the communication history of the communications device 2 but also the communication history of the information terminal 7 on the side of the internal network 6, and controls the communication packet in this manner by the packet control unit 22n.

Also, the packet control unit 22n can also control communication packets to cause the communications device 2 to function as a router, in addition to which the packet control unit 22n can control the communication packets to enable a firewall with respect to the side of the inbound network interface 23 to be configured and enable a firewall with respect to the side of the outbound network interface 24 to be configured.

Further, when the packet control unit 22n is used, it is made possible to respond, to a certain extent in real time, to DoS attacks, etc. on the IKE used in the VPN connection, and such information can also be analyzed by the history analysis unit 22p.

The above-described history information accumulation unit 22o is configured to sequentially store, in the communication history information storage unit 21g of the storage unit 21, communication history of the above-described communications device 2, a history of communication via the external network 1 of the information terminal 7 pertaining to the internal network 6 to which the communications device 2 pertains, or a history of the access communication to the communications device 2, which are stored as communication history. Also, the history information accumulation unit 22o sequentially stores the sensing results of various sensors such as the GPS sensor 25, the acceleration sensor 26, and the gyro sensor 27 as sensing information (sensing history information), which are stored sequentially in the sensing information storage unit 21h of the storage unit 21.

The above-described history analysis unit 22p is configured to carry out the analysis of the communication history. Specifically, the history analysis unit 22p analyses ordinary operating statuses based on the communication history at this time and the communication history stored in the history information accumulation unit 22o, where the operating statuses including workdays for each organization constituting the internal network 6 (e.g., a company as such or a predetermined department or section of this company, etc.) and status of attendance of each user, and sequentially stores the results of the analysis in the history analysis information storage unit 21i. It should be noted that the above-described DoS attacks and other attacks from outside can be recognized by this analysis.

Also, the history analysis unit 22p may automatically discriminate the information terminal 7 of the user making an access to the communications device 2 on the basis of the above-described operating status and sequentially store the result as the analysis results in the history analysis information storage unit 21i.

Further, the normal state of the communications device 2 is analyzed on the basis of the results of the detection of states acquired from the GPS sensor 25, the acceleration sensor 26, and the gyro Sensor 27 and the information on the sensing history stored in the sensing information storage unit 21h and the results of the analysis may be stored in the history analysis information storage unit 21i of the storage unit 21. Also, the communications device 2 may be configured such that it allows communications only in a predetermined time interval or may be connected to a particular sensor used in IoT (a temperature sensor, human sensor, various sensors such as that for sensing of an ID card, and a surveillance camera, etc.).

The above-described abnormality determination unit 22q is configured to determine an abnormal state of the communications device 2 on the basis of the sensing result and result of analysis of the communication history.

For example, when the fact that the position of the communications device 2 connected to the PC was changed has been detected by the GPS sensor 25, then the abnormality determination unit 22q determines that an abnormality has occurred considering the possibility of theft or the like. Specifically, first, at the time of the introduction of the communications device 2, the position information at the time of the initial power-on is recognized as the installation position of the communications device 2. Subsequently, if the position information that has been acquired by the GPS sensor 25 or the most recent position information stored in the sensing information storage unit 21h is different from the installation position, then the determination of the abnormality is performed and, if the position information is in agreement with the installation position, then the determination of normality is performed. Incidentally, the sensing history of the GPS sensor 25 or the analysis information thereof or the like may be acquired from the sensing information storage unit 21h or the history analysis information storage unit 21i to compare them with these pieces of information and thus the error in the sensing of the GPS sensor 25 can be corrected to a considerable degree.

Also, abnormality determination unit 22q determines that an abnormality has occurred when the fact that the attitude of the communications device 2 connected to the PC was changed or the fact that a load is acting thereon has been detected by the gyro Sensor 27 and the acceleration sensor 26, considering the possibility of theft or the like. Specifically, when the attitude information or the load information that has been acquired by the gyro Sensor 27 or the acceleration sensor 26 or the most recent attitude information or load information stored in the sensing information storage unit 21h takes an abnormal value different than a normal one, then the determination that an abnormality occurs is made while the determination that a normal state exists is made otherwise. Incidentally, when the attitude information or the load information stored in the sensing information storage unit 21h or the analysis information on the attitude information or the load information stored in the history analysis information storage unit 21i is used, it is made possible to increase the accuracy of the determination on normality or abnormality. Further, when the communications device 2 has moved due to an earthquake or fire, the sensor information associated therewith is notified to the management device 3 for performing the response at the time of occurrence of an abnormality. The response at the time of occurrence of an abnormality may encompass notification to all the users belonging to the group and stoppage or suspension or the like of the communications by the corresponding communications device 2.

In the case of a communications device 2 of a mobile terminal, the communications device 2 operates when it has passed the time code of the time authentication or the authentication check instructed to the terminal, and stops its operation when an abnormality has occurred. The authentication check is performed by image authentication by a camera, fingerprint authentication, and voice authentication, which are used alone or in combination.

Further, the abnormality determination unit 22q uses the analysis information of the communication history stored in the history analysis information storage unit 21i and performs determination of normality and abnormality based on the past or current communication history acquired from the two network interfaces 23, 24 and the communication history information storage unit 21g. Specifically, the determination of normality and abnormality regarding the unauthorized access, unauthorized operation, overload, and the like is performed on the basis of the access from the information terminal 7 of the user and the operation status associated with the access, an access from an information terminal 7 of a company, department/section, user, etc. expected to be on a holiday and the operation status associated with the access, presence or absence of abnormal rise in the load away from the normal load, and the like. Also, the communication histories of all the communications devices 2 are periodically sent to the management device.

When it has been determined by the abnormality determination unit 22q that an abnormality occurred, then the above-described communication regulation unit 22r regulates (prohibits) exchange of data and communications via the communications device 2 in which the abnormality has been determined to exist. When the communication is regulated in this manner, then the above-described exchange of the target data will also be prohibited. Incidentally, at this point, the communications devices 2 other than the communications device 2 in which the abnormality has been determined to exist maintain their communication functions in an unregulated state and it is possible to cause them to continue the transmission and reception of the target data within the same group. It should be noted that when an abnormality associated with unauthorized access or unauthorized operation has been determined to exist, then switching of the passwords, encryption keys, and the like may be allowed to be carried out in place of the above-described communication regulation or along with the communication regulation.

The communications device 2 configured as described in the foregoing can also be made to function as the transmitting-side communications device 2A and can also be made to function as the receiving-side communications device 2B. Incidentally, amongst the components incorporated in the control unit 22, the data reception unit 22h, the data transmission unit 22i, and the cancellation unit 22j are functional components dedicated to the transmitting-side unit while the data reception unit 22k and the data distribution unit 22l are functional components dedicated to the receiving-side unit. As a result, when the communications device 2 is used as a dedicated device for the transmitting-side communications device 2A, it is possible to omit the functions dedicated to the receiving-side while when the communications device 2 is used as a dedicated device for the receiving-side communications device 2B, it is possible to omit the dedicated functions for the transmitting-side.

Figure 13:
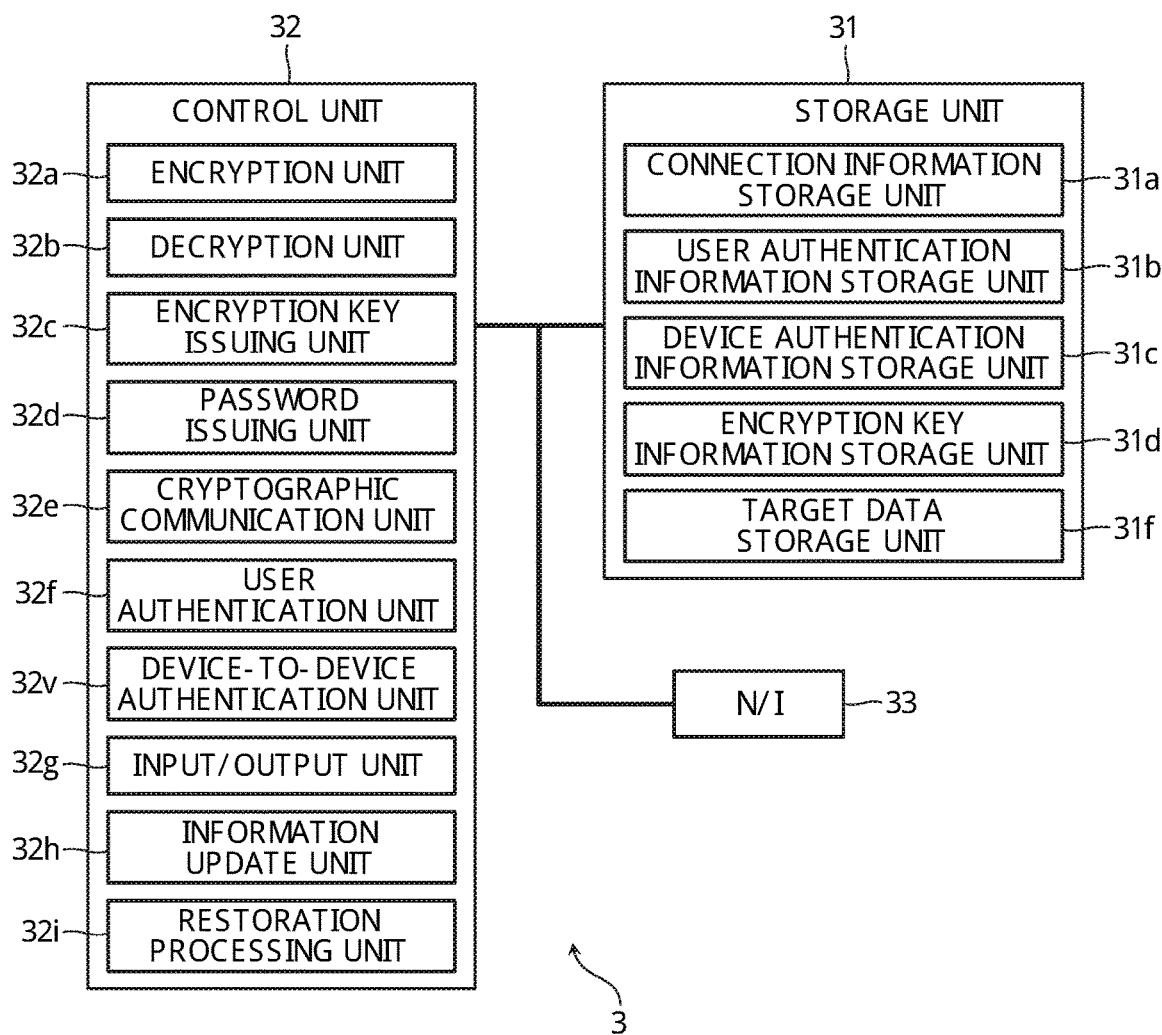
FIG. 13 is an explanatory diagram illustrating a configuration of a management device.

Next, the configuration of the management device 3 is described in detail based on FIG. 13.

FIG. 13 is an explanatory diagram that illustrates the configuration of the management device 3. The management device 3 illustrated in the same figure includes: a storage unit 31 constituted by the memory area including the secret area in the CPU, RAM, ROM, HDD, SSD and the like and configured to temporarily or permanently store various pieces of information; a control unit 32 constituted by the CPU, RAM, SSD, etc. and configured to execute various programs; and a network interface (communications unit) 33 connected to the external network 1 (specifically, the router 4).

All of the pieces of information of the respective communications devices 2 to be subjected to the management by the management device 3 may be stored in the above-described storage unit 31 with the same or similar data structures. Specifically, the storage unit 31 includes: a connection information storage unit 31a having the same or substantially the same configuration as that of the connection information storage unit 21a; a user authentication information storage unit 31b having the same or substantially the same configuration as that of the user authentication information storage unit 21b; a device authentication information storage unit 31c having the same or substantially the same configuration as that of the device authentication information storage unit 21c; an encryption key information storage unit 31d having the same or substantially the same configuration as that of the encryption key information storage unit 21d; and a target data storage unit 31f having the same or substantially the same configuration as that of the target data storage unit 21f. Meanwhile, unnecessary pieces of information may be omitted as needed and, for example, the communication history information storage unit (not shown), the sensing information storage unit (not shown), and the history analysis information storage unit (not shown) correspond to the data tables that can be omitted.

Incidentally, a user registered in the user authentication information storage unit 31b of the storage unit 31 becomes a system administrator who can access to the management device 3 using the information terminal (not shown) on the side of the management device 3 or the information terminal 7 on the side of the communications device 2. As a result, if the user who succeeded in accessing the management device 3 is allowed to freely acquire information by which an individual can be identified, then everything leaks out. Accordingly, pieces of information by which individuals can be identified and pieces of information by which individuals cannot be identified are separately managed and, a specific user who succeeded in accessing the management device 3 is not allowed to access pieces of information by which individuals can be identified, in addition to which, history is checked and whether or not information leakage occurs is always monitored by referring to present or absence or the like of an access to the storage unit 21 in an attempt to rewrite the device authentication list or the encryption key. Incidentally, the management device 3 is provided by a provider providing the services of this communications system. As a result, the system administrator who manages the management device 3 is either a provider or a person entrusted directly from the provider. Also, in order to prevent leakage of information from the system administrator who can access the management device 3, it is more preferable that at least the access to the user authentication information storage unit is redundantly checked by another system administrator and that all the management histories are recorded and a scheme for disclosure of the management histories of the management device 3 by the system administrator may be adopted as needed.

Connection information for performing encrypted communications with the respective communications devices 2 to be managed, ID information, the same or corresponding encryption key or password or trigger information triggering generation of them, and the like are stored in the connection information storage unit 31a, the device authentication information storage unit 31c, and the encryption key information storage unit 31d in the storage unit 31.

The above-described control unit 32 realizes various functions by programs that run on the operating system. The units to be used by the OS are the same or substantially the same as those of the above-described control unit 22. The control unit 32 includes: an encryption unit 32a having the same or substantially the same configuration as those of the encryption unit 22a; a decryption unit 32b having the same or substantially the same configuration as those of the decryption unit 22b; an encryption key issuing unit 32c having the same or substantially the same configuration as those of the encryption key issuing unit 22c; a password issuing unit 32d having the same or substantially the same configuration as those of the password issuing unit 22d; a cryptographic communication unit 32e having the same or substantially the same configuration as those of the cryptographic communication unit 22e; a user authentication unit 32f having the same or substantially the same configuration as those of the user authentication unit 22f; a device-to-device authentication unit 32v having the same or substantially the same configuration as those of the device-to-device authentication unit 22v; and an input/output unit 32g having the same or substantially the same configuration as those of the input/output unit 22g.

Also, the control unit 32 includes, independently of these units: an information update unit 32h configured to update predetermined information of the storage unit 21 of the respective communications devices 2 to be managed; and a restoration processing unit 32i. Incidentally, when information is updated, the information prior to the updating is not deleted but remains to be stored. The information history needs to be stored for at least a predetermined period of time such as five years.

The above-described information update unit 32h is configured to update the information of the communications device 2 to be managed. Specifically, when encrypted communications are performed between the communications devices 2, 2 or when the exchange of the target data through the external network 1 via these communications devices 2, 2 is performed, at least part of the connection information, the user authentication information, the device authentication information, and the encryption key information which these communications devices 2, 2 individually store in their storage units 21, 21 in advance needs to be made to be identical with or to correspond to each other to share at least part of them, and the synchronization of the information for that purpose is performed by the information update unit 32h. Also, the synchronization of the information is also necessary between the communications device 2 and the management device 3, so that this synchronization processing is likewise carried out by the information update unit 32h.

Incidentally, a new user, a new group, and new company information can be registered in the information update unit 32h. Specifically, the information update unit 32h replaces the information on the provisional users, company information, or the group information of the user authentication information storage unit 21b and the device authentication information storage unit 21c in the respective storage units 21 of the respective communications devices 2 to be managed or the communications devices 2A, 2B which are parties of the communications with each other to be managed by each other by actual data requested by the person in charge of management of groups after determination thereof. More specifically, the information update unit 32h encrypts the actual data using the common key or public key and transmits all at once the encrypted data via the communication line to the respective communications devices 2. Also, in the registration of the user information to the device authentication information storage unit 21c of the respective communications devices 2, the processing of changing the "Status" of the same user to "valid" (1) is performed in parallel, while in the deletion of the user information, the processing of changing the "Status" of the user to "temporarily invalid" (0) or "permanently invalid" (000) is performed. In this manner, the user changed to "invalid" becomes the above-described provisional user and the user changed to "permanently invalid" (000) becomes an irrevocably invalid user.

It should be noted that one or more communications devices 2 may further reside on the communication channel between the transmitting-side communications device 2A and the receiving-side communications device 2B using the information update unit 32h. In this case, a list of the IP addresses of the communications devices to be received on the communication channel is included in the transmission data and, when the respective communications devices have received the data, then the IP addresses are rewritten to be addressed to the next communications device and transmission thereof may be repeated. In this case as well, the communications between the interconnected communications devices 2, 2 are encrypted using the same scheme as that in the above-described embodiment.

The above-described restoration processing unit 32i carries out the processing to release the communication regulation for the communications device 2 in the state where communications are regulated by its own communication regulation unit 22r. Incidentally, the restoration processing by the management device 3 is carried out after the state where the regulation of the communications can be released has been confirmed.

Figure 14:
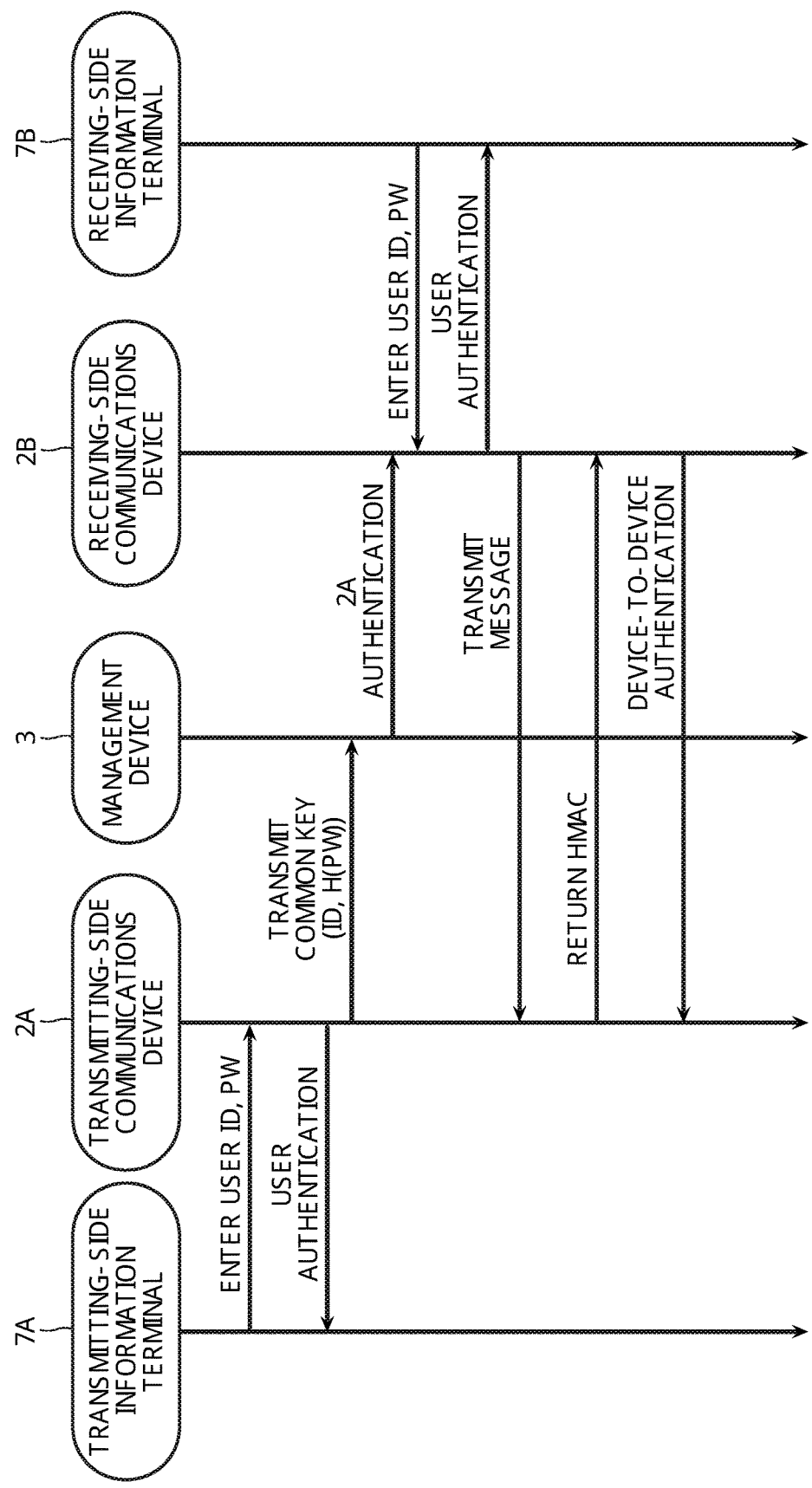
FIG. 14 is a flow diagram illustrating a processing procedure in device-to-device authentication by this communications system.
Figure 15:
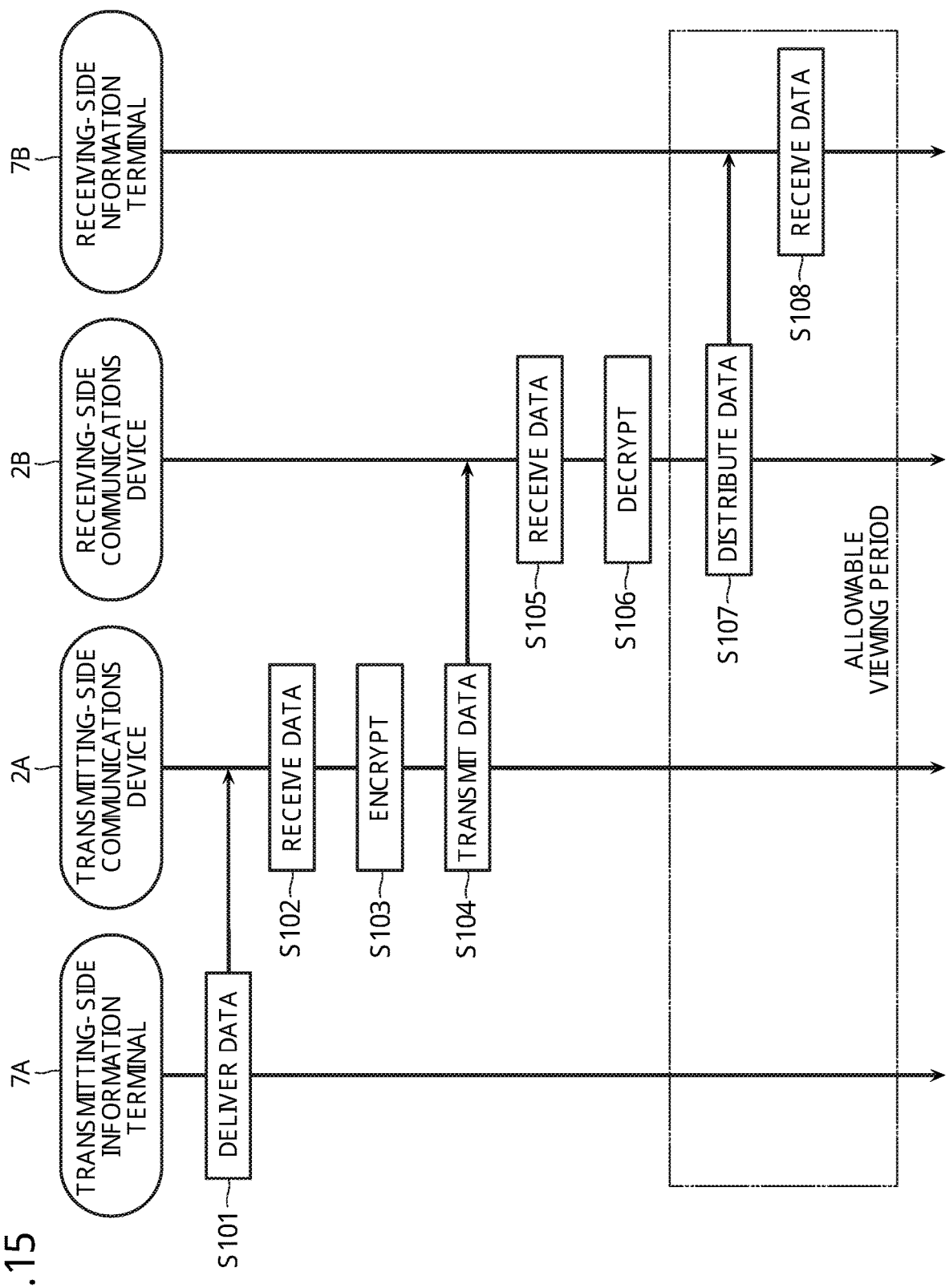
FIG. 15 is a flow diagram illustrating a processing procedure in exchange of data by this communications system.

Next, the processing procedure at the time of exchanging data by this communications system is described based on FIG. 14 and FIG. 15.

FIG. 14 is a flow diagram that illustrates the processing procedures of the user authentication and the device-to-device authentication in exchanging data by this communications system. First, at the time of the introduction of this communications system, the provider of the communications device 2 stores in advance information necessary for confidential communications in the storage units 21, 31 specified in the secret areas of the CPUs of the communications device 2 and the management device 3. The information includes provisional information regarding the users and groups which will be added in the future. The information concealed and stored in advance is the device authentication lists 21c1 to 21c4 and the encryption key information 21d1 to 21d3. Also, prior to use of this communications system, the users of the information terminals 7A, 7B specify the user Id and the password in the communications devices 2A, 2B. The user ID and the password are also stored in the user authentication information storage unit 21b of the storage unit 21. Also, the communications device 2 hashes the password using SHA-224, SHA-256, SHA-384, SHA-512, etc. and stores the pair of the user ID and the hashed password in the storage unit 21 of the communications device 2. As will be appreciated from the foregoing, the operation to be performed by the user only involves entry of the user ID and setting of the password. It should be noted that the registration information of the device authentication information storage unit 31*c* is allowed to be viewed by all the users registered in the group except for the confidential information such as the password, encryption key, to be concealed or the trigger information triggering generation of them, or the like.

Next, an example of the device-to-device authentication process is described. At the start of the communication, the user first activates the information terminal 7 and enters the user ID and the password or its hash data. Alternatively, the user activates the GUI and enters the user ID and the password or its hash data via the transmitting-side information terminal 7A. The transmitting-side communications device 2A compares the user ID and the password or its hash data which are stored with the user ID and the password or its hash data which have been entered and, when they agree with each other, determines that the user authentication is successful and places the information terminal 7 or the GUI in the login state. It should be noted that address information of part of the registered users is displayed on a GUI imitating an envelope.

When the user authentication is completed, then the transmitting-side communications device 2A encrypts the device ID and the password (or password hashed by SHA-224, SHA-256, SHA-384, SHA-512, etc.) of the destination user using a common key or a public key of the management device 3 and transmits them along with the switch header of the encryption key to the management device 3 in order to perform device-to-device authentication with the receiving-side communications device 2B via the management device 3. The management device 3 decrypts the device ID and the password that have been received using the common key specified by the switch header or the private key of the management device 3 and carries out the device-to-device authentication of the sender and the recipient on the basis of the registered information of the device authentication information storage unit 31*c* and transmits the result of authentication to the receiving-side communications device 2B.

The receiving-side communications device 2B performs authentication of the transmitting-side communications device 2A, in response to the result of authentication from the management device 3. The authentication can be performed by the same or similar procedure as in VPN connection as described above. For example, data combining the message necessary for the authentication, the common key, and its switch header is hashed to generate a message authentication code (HMAC), and the message and the message authentication code are transmitted and received between the transmitting-side communications device 2A and the receiving-side communications device 2B. The common hash programs are shared by the transmitting-side communications device 2A and the receiving-side transmission device 2B, and the message authentication code that has been generated from the received message and the message authentication code that has been received are compared with each other, and if they agree with each other, it is determined that the device-to-device authentication has been successful. It should be noted that the switch header of the hash programs is transmitted when the common hash programs are switched to be used.

According to this communications system, encrypted communication is established in advance between two communications devices 2A, 2B by the above-described scheme and the state of the communication is maintained. Also, a state of connection where the encrypted communication can be performed is established as needed between the respective communications devices 2 and the management device 3 as well. Incidentally, the target data to be exchanged (transmitted and received) may encompass various types such as sensing data, programs and commands for machine control or sequence control, data, etc., as well as document data, still image data, video data, voice, music, e-mail data, and FTP data.

Also, the user can change the password of the device ID and the encryption key stored in the device authentication information storage unit 21*c* and the encryption key information storage unit 21*d* at an appropriate timing, in which case, the switch header is transmitted by the information update unit 32*h* between the communications devices 2, 2 and between the communications device 2A and the management device 3 and thereby the switch header can be shared in real time. Specifically, it is possible to make modification on the data table associated with the device-to-device authentication between the communications devices 2, 2 of the same group. Also, in addition to the modification by the data table, a one-time password or one-time encryption key can be generated using the encryption key issuing unit 22*c* and the password issuing unit 22*d* and transmitted using the common key so as to share the one-time password or one-time encryption key in the same group. Further, it is also possible to deliver a password and an encryption key stored in a memory card and updated by postal mail or other transportation services.

Next, the encrypted communication procedure of data after the authentication is described with reference to FIG. 15.

First, the transmitting-side information terminal 7A delivers the target data to the transmitting-side communications device 2A via the input/output unit 22*g* of the transmitting-side communications device 2A (S101).

The transmitting-side communications device 2A receives the target data by the data reception unit 22*h* (S102) and encrypts the target data that has been received by the encryption unit 22*a* (S103). Specifically, the transmitting-side communications device 2A encrypts, for example, the header information section which includes the information on communication control, authentication, and encryption appended to the data body of the target data and the like using a public key of the receiving-side communications device 2B and encrypts the data body using a common key. At this point, the header information section should include the switch header for the common key and the public key of the receiving-side communications device 2B.

Strength (level of importance) is selected for this encryption process in accordance with the confidentiality level. For example, if the confidentiality level is low (e.g., the case of "Personal"), the encryption is not performed and only the scrambling process of the redivision and relocation process is performed; if the confidentiality level is intermediate (e.g., the case of "Important"), one round of the encryption process is performed; and, if the confidentiality level is high (e.g., the case of "Confidential"), multiple rounds of the encryption process are performed. In the case of multiple encryption processes, one of these multiple processes may use a disclosed public key while the remaining ones use a concealed private key, or different encryption algorithms may be used in the encryption processes. Also, when multiple rounds of encryption are performed, the encrypted data may be further encrypted or the scrambling process of the redivision and rearrangement may be used to perform encryption on each of the divided pieces of data as described above using the same or different algorithms and/or encryption keys. It should be noted that, since the communications as such are encrypted, no plain text will be exchanged even when the encryption is not performed in the step S103.

The target data that has been encrypted in this manner is transmitted by the data transmission unit 22*i* of the transmitting-side communications device 2A to the receiving-side communications device 2B (S104).

The receiving-side communications device 2B receives the target data by the data reception unit 22*k* (S105) and decrypts the target data that has been received by the decryption unit 22*b* (S106). Specifically, the header information section of the received target data is decrypted using a private key and the main body of the target data is decrypted using a common key.

Incidentally, the encryption key used in the encryption of the target data is stored in advance in the encryption key information storage unit 21*d* of the transmitting-side communications device 2A and the storage unit 21 of the receiving-side communications device 2B as common data or corresponding data, and the encryption key is shared, and settings using these pieces of information have been already done, so that it is not necessary to make various settings at the time of the introduction associated with encryption and decryption, in addition to which transmission and reception of the common key and the public key will not be required, either.

Also, the confidential information necessary for encryption and decryption of the target data may be shared as needed between the respective communications devices 2 and the management device 3. Further, it is also possible to update in real time and share these pieces of information by the above-described information update unit 32*h* between the communications devices 2, 2 and between the communications device 2A and the management device 3.

It should be noted that as described in the foregoing, encryption and decryption take place for multiple rounds in accordance with the confidentiality level but the information on what kind of encryption should be performed in accordance with the confidentiality level needs to be grasped by the party performing the decryption as well. A possible scheme for the recognition thereof is that the information is encrypted and included in the header information or the scheme for encryption and decryption is defined in advance in the communications device 2.

Also, when the encrypted target data is decrypted, the information on the confidentiality level of the target data is needed, and this information is exchanged in the course of the direct or indirect exchange between the transmitting-side communications device 2A and the receiving-side communications device 2B. Specifically, this exchange will be carried out at the time of the operation using the GUI of the FIGS. 12 and 14 which will be described later.

The target data that has been decrypted in this manner is distributed by the data distribution unit 22*l* of the receiving-side communications device 2B to the receiving-side information terminal 7B of the user (S107).

Meanwhile, the distribution is allowed to take place only in the viewing period of the target data and only when the number of times of viewing remaining is not 0. In other cases, the distribution is regulated by the viewing regulation unit 22*m*. Also, the data distribution unit 22*l* performs the processing for decrementing the number of times of viewing of the target data by one (1) at each rounds of the distribution process in cases other than the case where the allowable number of times of the viewing of the target data is specified as "Unlimited" (specifically, cases where a finite value is specified).

The receiving-side information terminal 7B receives the target data from the receiving-side communications device 2B (S108). Incidentally, when multiple destinations are specified, the same number of pieces of target data as that of the destinations are generated on the side of the transmitting-side communications device 2A and the processes at and after the encryption step (S103) are performed on each of the pieces of target data.

It should be noted that, according to the above-described communication structure, the respective communications devices 2 identify not only the management device 3 but also the communications device 2 as a party to be involved in the communication, which are specified as early as the time of the system introduction, but this communication configuration may be adapted to be updated in real time by the information update unit 32*h*. At this point, the respective communications devices 2 and the management device 3 may hold a connection list or the like in the connection information storage unit 21*a* such that this list is to be updated.

It should be noted that when the above-described encrypted communication is to be performed using a one-time encryption key, the following procedure should be performed.

After the transmitting-side communications device 2A has received the data (S102), the password issuing unit 22*d* is activated to generate a one-time password, and a request is sent to the receiving-side communications device 2B to urge it to activate the encryption key issuing unit 22*c*. Since the one-time password is different from the password of the user, it is generated as a new password for each round of transmission. The encryption key generated by the receiving-side communications device 2B is a private key, and the public key is generated from this private key. Subsequently, the public key that has been generated is encrypted using a common key and transmitted to the transmitting-side communications device 2A. The transmitting-side communications device 2A decrypts the public key of the receiving-side communications device 2B using the common key, and encrypts the target data using the public key that has been decrypted, and places the target data that has been encrypted in the state where opening thereof is restricted using the one-time password. In addition, the data obtained by combining the opening-restricted target data and the one-time password is encrypted using the common key.

The receiving-side communications device 2B decrypts the received target data using the common key and extracts the one-time password from the data that has been decrypted to open the target data. Further, it decrypts, using the private key, the header information section of the target data that has been opened and decrypts the body section using the common key.

Also, the common key may be generated by the encryption key issuing unit 22*c*. In this case, the common key is encrypted by a public-key scheme and then transmitted to the other party. Specifically, the following process is performed.

(1) First, the public keys of the respective communications devices are transmitted or specified either all at once or individually in advance by the system administrator to or in all of the communications devices 2. It should be noted that the sender may have the public key of the other party (recipient) obtained for each round of transmission.

(2) The sender generates the common key and encrypts a plain text using the common key. Since encryption takes place using the common key, the time required in the encryption is shortened.
(3) The sender encrypts the common key that has been generated using the public key of the communications device 2 of the other party (recipient). Since the length of the common key is in the order of several dozen to several hundred bits, not so much time will be required even when the encryption takes place based on a tardy public-key scheme.
(4) The sender transmits the encrypted text and the common key that has been encrypted using the public key.
(5) The recipient decrypts, using the private key, the "common key that has been encrypted using the public key" that has been received.
(6) The recipient decrypts, using the common key that has been decrypted, the encrypted text that has been received. In this manner, the plain text is allowed to be extracted.

In this case, if sniffing is being attempted on the network, what the sniffing person can get will include the public key of the recipient, the plain text that has been encrypted using the common key, and the common key that has been encrypted using the public key. The data encrypted using a public key cannot be decrypted without using a private key, and the sniffing person cannot get the common key. If the common key is not available, it is not possible to decrypt the plain text.

Figures 16, 17:
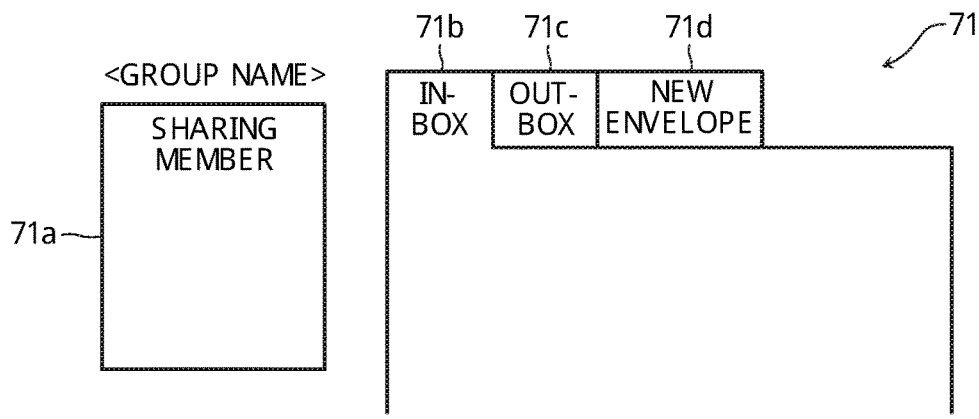
FIG. 16 is an explanatory diagram illustrating a configuration of a group top screen which is a type of GUI.
FIG. 17 is an explanatory diagram illustrating a configuration of a transmission screen which is a type of GUI.
Figure 18:
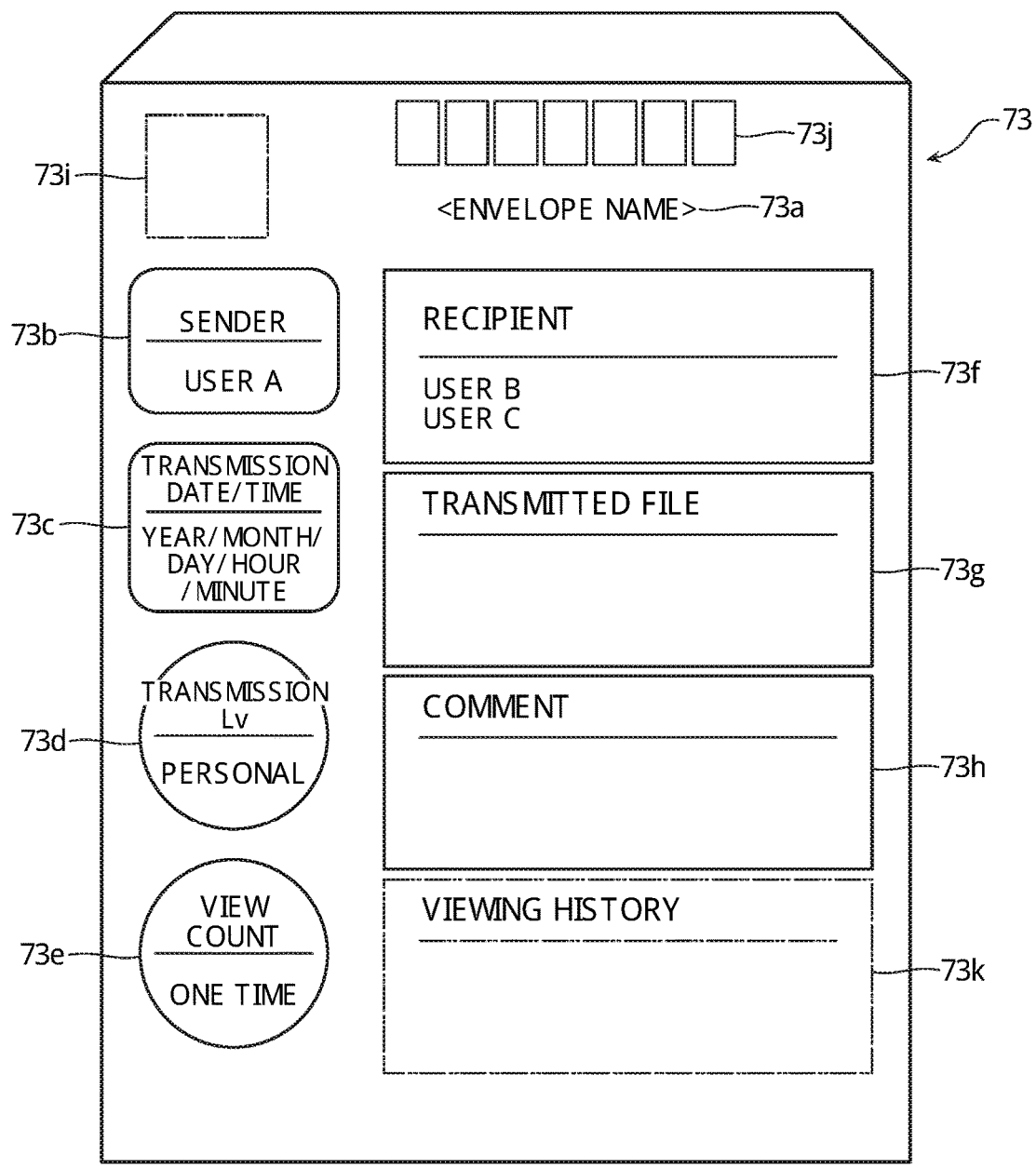
FIG. 18 is an explanatory diagram illustrating a configuration of a target data display screen.

Next, the configuration of the GUI presented on the information terminal 7 is described based on FIGS. 16 to 18.

FIG. 16 is an explanatory diagram that illustrates a configuration of a group top screen, which is a form of a GUI. When the user logs in to the communications device 2 by entering by the information terminal 7 the user ID of the user (or the e-mail address of the user) and the password, then the groups to which this user belongs are displayed and, when one group is selected from among these groups, the group top screen 71 illustrated in FIG. 16 is displayed as the GUI.

The group top screen 71 includes: a sharing member display section 71a in which names (full name) of one or more users belonging to this group are acquired from the device authentication information storage unit 21c and displayed in the form of a list; a received data display operation section 71b (indicated as "In-Box") on which an operation (click operation) is performed which triggers acquisition of pieces of target data that the user who has logged in received as the group, which are acquired from the target data storage unit 21f and displayed in the form of a list; a transmitted data display operation section 71c (indicated as "Out-BOX") on which an operation (click operation) is performed which triggers acquisition of the pieces of target data that the user who has logged in transmitted as the group, which is acquired from the target data storage unit 21f and displayed in the form of a list; and a transmission screen display operation section 71d (indicated as "New envelope") on which an operation (click operation) is performed which triggers display of the transmission screen 72 (see FIG. 17) for the user who has logged in to transmit the target data to another or a plurality of other users belonging to this group. Incidentally, with regard to the users' information, in order to avoid identification of an individual, abbreviated names and on-line names may be indicated.

FIG. 17 is an explanatory diagram that illustrates the configuration of the transmission screen, which is a type of a GUI. The transmission screen 72 includes: a subject entry unit 72a in which "Subject" of the target data storage unit 21f is entered (indicated as "Envelope Name"); a viewing period input section 72b in which the "viewing period" of the target data storage unit 21f is entered; a confidentiality level entry unit 72c in which the "confidentiality level" (indicated as "Transmission Level") of the target data storage unit 21f is entered (in the illustrated example, either of the "Personal" radio box, the "Important" radio box, and the "Confidential" radio box is selected); an allowable viewing counts entry unit 72d in which the "allowable viewing counts" of the target data storage unit 21f is entered (in the illustrated example, a checkbox is provided which sets the allowable viewing counts to one (1) so that only one time or unlimited is selected by presence or absence of the check in it); an address designation section 72e in which the "recipient" (indicated as "Destination") of the target data storage unit 21f is designated (in the illustrated example, users belonging to this group are displayed in the form of a list to select the recipient as the destination by means of the checkbox of each user); a transmitted file designation section 72f in which one or more pieces of the body data of the target data (indicated as "File") are specified; and a comment entry section 72g in which the "comment" of the target data storage unit 21f is entered. Incidentally, in the designation of the above-described number of times of viewing, any appropriate number of times may be entered.

FIG. 18 is an explanatory diagram that illustrates the configuration of the target data display screen. The target data display screen 73 displays the content of the target data and it is displayed on the same screen as that of the transmission screen 72 so as to constitute part of the GUI.

Specifically, the target data display screen 73 imitates an envelope which is a postal item, and includes: a subject display section 73a in which the "Subject" (in the illustrated example, "Envelope Name") of the target data storage unit 21f is displayed; a sender display section 73b in which the name (full name) of the "sender" of the target data storage unit 21f is displayed; a transmission date and time display section 73c in which the "transmission date and time" of the target data storage unit 21f is displayed; a confidentiality level display section 73d in which the "confidentiality level" (indicated as "Transmission Level") of the target data storage unit 21f is displayed; a viewing count display section 73e in which the "number of times of viewing" of the target data storage unit 21f is displayed; a destination display section 73f in which the "recipients" (users as the destinations) of the target data storage unit 21f are displayed in the form of a list of full names, abbreviated names, on-line names, or the like; a transmission file display section 73g in which file names or the like of one or more pieces of the body data of the target data are displayed in the form of a list of transmitted files; a comment display section 73h in which the "Comment" of the target data storage unit 21f is displayed; a transmission enabled state switching section 73i to enter a state where transmission (delivery) of the target data is possible when an image imitating a postal stamp is dragged and pasted to this location to transmit the target data; and a code display section 73j in which the code of the group to which the user exchanging the target data belongs (e.g., the "Group ID" of the group information storage unit 21d, etc.) is displayed.

It should be noted that the target data display screen 73 may be configured as a screen imitating a slip as well as a postal item, and a screen imitating a postal item and a screen imitating a slip may be selected. In addition, in the above-described example, a screen is described which imitates a vertically long postal item but it may be a horizontally long postal item, or one screen may be selected from among a screen imitating a vertically-elongated postal item, a screen imitating a horizontally-elongated item, and a screen imitating a slip.

Incidentally, undefined information is indicated as a blank field. For example, the transmission date and time is yet to be defined at the time of the entry into the transmission screen 72, it is indicated by "****" or as a blank field.

Also, when an image imitating a postal stamp is pasted as described above in the transmission enabled state switching section 73i, a transmission button 72h is displayed in the above-described transmission screen 72 and when the transmission button 72h is clicked, transmission (delivery processing) of the target data from the transmitting-side information terminal 7A is actually carried out.

Further, when one piece of target data has been selected from the list of multiple pieces of target data received in the group top screen 71, or when one piece of the target data has been selected from the list of multiple pieces of target data transmitted, the target data display screen 73 is displayed, in which case the actual date and time are indicated as the transmission date and time.

When the received target data is to be checked, a viewing history display section 73k in which viewing history of the recipient is indicated is displayed in the above-described target data display screen 73. It should be noted that at the time of checking of the transmitted target data as well, the viewing history display section 73k can be displayed, but in order for the display, it is necessary to synchronize the pieces of information stored in the target data storage unit 21f between the transmitting-side communications device 2A and the receiving-side communications device 2B, and this synchronization processing may be carried out by the above-described information update unit 32h.

It should be noted that the GUIs illustrated in FIGS. 17 and 18 may be provided as dedicated interfaces for each group. In this case, the GUIs are foolproof and very user-friendly, for they vary depending on the groups.

According to the communications system configured as described in the foregoing, by virtue of intuitively easy-to-understand GUIs, it is made possible to exchange target data in a state where high security is ensured without the need of being conscious about complicated algorithms between users.

In particular, since the authentication is performed using multiple factors, i.e., the user authentication and the device-to-device authentication, it is made possible to readily exchange data while maintaining high security. The multi-factor authentication may be implemented with much more factors. For example, an additional authentication factor based on position information acquired by the GPS sensor 25 may further be added. Specifically, when it has been detected by the GPS sensor 25 that the communications device 2 is out of its original position where it should be found, the access by the user authentication is denied or the device-to-device connection by the device-to-device authentication is denied. Also, position information on the business trip areas and countries such as business trips to domestic areas and foreign countries may be used in the course of the user authentication and a response may be made when the device is not found in the authorized areas.

Also, the encryption processing based on multiple factors to perform multiple encryption processes redundantly is also performed at the time of the encryption and decryption of the target data. Specifically, an encryption process that the user performs using the GUI from the information terminal 7A is used on one hand and an encryption process for the device-to-device communication is used on the other hand.

Also, since time and labor at the time of the introduction are reduced by preliminary information sharing and accompanying preliminary settings, this communications system can be introduced in various business areas. For example, this communications system can be used in exchange of data among a customer, a design company and a printing company, and exchange of data among a customer, a design company, a magazine company or a newspaper company, and a printing company or a newspaper factory.

Also, this communications system can be used in the patent business areas or other legal or financial affairs often dealing with confidential information under confidentiality obligation, and in exchange of drawing data, translation data, or other confidential information, or in exchange of data with foreign countries.

Further, it is also made possible to incorporate information terminal 7 as a module in a built-in camera of a digital camera or smartphone to share data photographed among a plurality of cameras; share data captured via PCs with each other; and achieve implementation using this in communications such as telephone, net meeting or videoconferencing system, online shopping system, etc. with the bandwidth of the network line secured. Incidentally, in such a case, the process to deliver the data to the data reception unit 22h needs to be automatically performed by an application or the like.

Also, in the one example described above, it is possible to handle as the target data still image data, video data, or sound data acquired by a camera or microphone for video conferences, or still image data or video data captured by a monitoring camera. The information terminals 7A, 7B may be incorporated into the camera and/or microphone. For example, in the case of a surveillance camera, the authentication will proceed as follows. First, the surveillance camera is connected via the communications device 2 to, for example, an external network 1 (the Internet) complying with 5G (fifth-generation) specifications. A user accesses his/her own information terminal 7 (personal computer) using his/her user ID and password and selects the registered ID of the surveillance camera from the slip GUI for the same surveillance camera, and thus the communications device 2 connected to his/her own information terminal 7 performs the device authentication on the communications device 2 of the surveillance camera via the management device 3. When the authentication has been successfully performed, the user can watch or record the video of the surveillance camera using his/her own information terminal 7.

Also, it can also be used as a security communication between a color management department and a printing factory together with an engine that performs color conversion in order to integrate pieces of color information output differently from each other depending on the individual printing machines. Further, along with sharing of sensing information and remote control etc. in mind, it can also be applied to encrypted communication in data communications between the information management center of an automobile manufacturer or the traffic control center which is the specialized organization of the country (of the police headquarters controlled by the Public Safety Commission) and the control devices of automobiles. In this case as well, in the same or similar manner as in the above-described example of application, it is necessary to automatically perform the process of passing data to the data reception unit 22h by an application or the like. Also, this communications system may be used in communication between a traffic control center that controls and manages traffic lights and an automobile. Furthermore, based on the maneuvering management information, abnormal driving information, and road and area information in the automatic driving of automobiles, an information management center etc. of a road management corporation etc. may prompt a driver for attention, provide information for safe driving, or safely perform provision of data to automotive driving devices.

Also, this communications system can also be used in: transmission and reception of data between government offices and municipalities; transmission and reception of data between branch offices or between a branch office and a head office of a company; transmission and reception of data between project members within a company; transmission and reception of electronic medical records in a medical facility; transmission and reception of important information such as electronic medical records, confidential information, and collaborative design plans over a wide area; online manuscript submission; electronic PO Box service; and the like.

In addition to this, in building projects, construction is performed under information management by multiple groups of multiple companies, such as basic design, procurement of building materials, purchase cost management, personnel arrangement for construction sites, construction progress status, shared complaint information, legal documents to be submitted. Even those in charge who are unfamiliar with information management can perform information transmission safely while keeping the information in this construction project secret without the need of being aware of the security management.

Further, the communications device 2 may be coupled to a heavy object such as a safe to prevent physical theft.

It should be noted that at least one communications device 2 in this communications system may include an information update unit (not shown) and a restoration processing unit (not shown) having the same or substantially the same configurations as those of the information update unit 32*h* and the restoration processing unit 32*i* of the management device 3. By virtue of this, it is made possible to omit the management device 3.

Meanwhile, in this case, it is necessary to determine in a distinct manner whether or not the user who accesses the communications device 2 is an administrator having the privileges needed in the management of various settings for the communications device 2 or a general user without the privileges for the management. As a result, "a person in charge of management of groups" is entered in the "Privilege" filed provided in the device authentication information storage unit 21*c* in the storage unit 21 of the communications device 2 while "User" is entered in the field of the privilege of a general user.

In addition to this, "Guest Transmission User" who is entitled to perform transmission and reception temporarily or continuously or perform transmission only, and "Guest Reception User" who is entitled to perform reception temporarily or continuously for a limited period of time may be provided. A guest transmission user and a guest reception user are users who are given the privilege to access the communications device 2 temporarily. "Time-Limited Sender" is entered in the privilege field of the guest transmission user and "Time-Limited Recipient" is entered in the privilege field of the guest reception user. At this point, the registration of the "Guest Transmission User" or the "Guest Reception User" is performed by the user of the communications device 2 submitting the electronic application to the system administrator via the "person in charge of management of groups." The system administrator sends a notification of the permission to the "person in charge of management of groups" and the user of the communications device 2, and performs the registration to the GUIs of all members of the same group, and a time-limited password is given to the "Guest Transmission User" or the "Guest Reception User." Also, the "Guest Transmission User" or the "Guest Reception User" is disclosed on the device authentication list as well.

Meanwhile, even when the management device 3 is not omitted, the device authentication information storage unit 21*c* may include the fields of "Time-Limited Privilege" for an administrator, a general user, a guest transmission user, and a guest reception user. The administrator may be allowed to have a function to give permission for transmission, reception, and information updates to other users within a company (intra-organization organization management function). Alternatively, such a special privilege may be allowed to be separately entered in the field of "Special Privilege" and a user having such a special privilege may be handled as "Special User" to increase the types of users.

The person in charge of management of groups and the user having a special user privilege grant permission to transmit the target data, permission to receive the target data, permission to create a new group, permission to register a new user in an existing group, permission to delete a user registered in the existing group, and the like. Permission to transmit or receive the target data may be granted for each user belonging to the group or may be granted to the group as a whole.

Also, permission by a general user or a person in charge of management of groups may also be required in the setting of the above-described guest transmission user or the guest reception user.

Also, as indicated by virtual lines in FIG. 2, a connection device 28 may be provided which includes an external storage medium connected removably to the body of the communications device 2, a token, or other information terminals or the like having communication function such as a camera, a smartphone, and a tablet device. The connection device 28 includes a connection information storage unit 28*a*, a user authentication information storage unit 28*b*, a device authentication information storage unit 28*c*, and an encryption key information storage unit 28*d*, which have the same or substantially the same configurations as those of the above-described connection information storage unit 21*a*, the user authentication information storage unit 21*b*, the device authentication information storage unit 21*c*, and the encryption key information storage unit 21*d*, respectively.

In addition, the connection information storage unit 28*a*, the user authentication information storage unit 28*b*, the device authentication information storage unit 28*c*, and the encryption key information storage unit 28*d* includes the various pieces of information that have been added to, modified in, or deleted from storage unit 21. The control unit 22 sets a pre-announcement period, a post-announcement period, or the like on the basis of these pieces of addition, modification, or deletion information, and it is thus made possible to: perform modification and/or deletion of pieces of information on the privileges of the new user and existing users and other information; modification of the information on the new group and the existing groups; addition of new connection-destination communications device 2; or modification and/or deletion of the connection information of an existing communications device 2. As a result, it is made possible to carry out updating of the various pieces of information by connection of the connection device 28 without relying on the information update unit 32*h* of the management device 3 and the information update unit of the communications device 2. The updating at issue may be applied to all pieces of information described above or may be only applied to part of these pieces of information. Also, it is also possible to respond to this by the above-described table change, and, in this case as well, all pieces of information may be subjected to the updating or only part of all pieces of information may be subjected thereto.

By incorporation of such a function, it is made possible for a user to change and update the network configuration, the user information, the group information, and the like in a state where the time and labor of the settings on the user-side communications device 2 are reduced. For example, a general user, a guest transmission user, or a guest reception user in a certain group is allowed to create at any time one or more new groups on their own accord and it is also possible for the user to act as a general user in the new group.

Incidentally, a user belonging to one group and having the privilege to submit an application for addition of a new user to the same group is defined as the "person in charge of group registration." The person in charge of group registration submits the electronic application to the system administrator using the public key and common key transmitted from the system administrator of the management device 3. The system administrator decrypts the incoming application form within the management device 3 and transmits the device ID and the full name of the new user, and the device authentication list which includes the additional information of the new user including the state switched to "valid" and the information on the deletion of the member user to all the communications devices 2 of the group for which the application was submitted via the management device 3. At this point, the system administrator of the management device 3 may also transmit the hash data of the device authentication list to the communications device 2 of the group so as to prevent falsification of data by checking the device authentication list at the time of operation of the management device 3.

Next, the specific method for registering addition of new user and deletion is described.

First, when a new user is to be added, the person in charge of group registration submits an electronic application for addition of the new user to the system administrator. The system administrator to which the electronic application has been submitted performs filtering and virus check on the additional information on the new user and, if no problem has been found, performs the encryption processing thereon and registers it in the device authentication list of the management device 3. In addition, it is ensured that all the users in the group are allowed to view at least part of the device authentication list that has been updated except for the confidential information. This is also displayed as partial destination information on the envelope GUI. When the newly registered user enters the user ID and the password in his/her own information terminal 7, the communications device 2 hashes the password to store it along with the user ID in the storage unit 21.

When a user is to be deleted, the person in charge of group registration submits an electronic application for deletion of the user to the system administrator. The system administrator sets the header information of the information on the user for which the application was submitted in the device authentication list such that the header information indicates "communication prohibited" and registers the modification along with the date and time in the device authentication list. It is ensured that all the users in the group are allowed to view the device authentication list that has been updated except for the confidential information. The envelope GUI is displayed with part of the destination information updated. When a permanently deselected number is defined, the individual name and the header information of the relevant information are placed in a state where communications thereof are permanently prohibited.

Next, the specific method for registering addition of a new group is described.

A user in the group submits an electronic application for new group registration to the system administrator. A certificate indicating that the communications device 2 is introduced by all the users in the group is attached to the electronic application. The system administrator performs filtering and virus check on the information on all the users of the group for which the electronic application was submitted and, if no problem has been found, registers the information on the new group in the device authentication list of the management device 3. The registration is performed by identifying the group ID and the device ID of the provisional group and the provisional user and switching from the invalid state to the valid state. Meanwhile, when each user of the newly registered group enters his/her user ID and password in his/her own information terminal 7 for settings, the communications device 2 hashes the password and stores it in the user authentication information storage unit 21*b* of the storage unit 21. It is ensured that all the users in the group are allowed to view the device authentication list that has been updated except for the confidential information. This is also displayed as partial destination information on the envelope GUI.

The system administrator of the management device 3 encrypts the update information of the device authentication list, specifically, the enabled group ID and device ID and notifies them to all the users belonging to the same group including the user newly registered in the same group.

It should be noted that independently of the person in charge of group registration, a user belonging to this group and performing management of the same group may be defined as "a person in charge of management of groups." In addition, the device authentication list including the information on addition or deletion of a user to or from the group may be double-checked by the person in charge of group registration and the person in charge of management of groups.

Also, in the same way as creating a new group, it is also possible to submit an application for addition of the communications device 2 to the system administrator of the management device 3. The application includes the information on the companies, section names, addresses, names, commonly used names, and contacts of the main users constituting this group.

Also, a person in charge of management of groups, a person in charge of group registration, and other users can urge users having the same type of the communications device 2 to join the new group. At this point, a guest ID, a one-time password, etc. are used for accessing their respective communications devices 2.

Tasks associated with the addition of a new group, addition of a user in a group, or applications therefore can be performed by simple attachment and detachment of the connection device 28 provided with the additional information already specified by the system administrator. In addition, by repeating such modifications, it is made possible to provide the extensibility of the network structure, and redundancy in the user configuration and the group configurations.

The connection device 28 may include the control unit 22, the network interfaces 23, 24, and various information detection sensors 25, 26, 27 of the communications device 2. In this case, it is made possible to use it as a backup device at the time of malfunctioning of the communications device 2. In addition, the control unit of the connection device 28 acquires its own position by means of the GPS sensor and determines that the communications device 2 is out of its original position where it should be located if the acquired position is not found within a certain range (zone), and determines by the abnormality determination unit 22$q$ that an abnormality has occurred. Also, it may be determined by the abnormality determination unit 22$q$ that an abnormality has occurred when any use out of the original use time has been detected by a timer provided in the device itself. Further, in order to determine whether or not the person is really authorized to use the connection device 28, the person may be requested to enter the password or pass biometric authentication using fingerprints, veins, or the like, face authentication, voice authentication, or the like.

Further, dummy information (hereinafter referred to as "false data") may be included in addition to the original data (e.g., target data, etc. which will be hereinafter referred to as "true data") in the data to be exchanged in the communications between the communications device 2 and the management device 3 or between the communications devices 2, 2. The false data can be readily included in the data exchanged as described above in a state where the false data cannot be distinguished from the true data, which enhances the security.

In addition, when a communications system that maintains such high security is used, it is also possible to include sensing information or sequence control information for controlling an IoT device in the data exchanged as described above. In addition, it is also made possible to include therein M2M information which includes information collected from pieces of equipment and information for controlling the equipment. When the IoT information or the M2M information can be included, sharing of the sensing information via the external network 1 and machine control can be easily realized. In addition, further safety can be ensured by providing a concealed area in the CPU of the IoT equipment or M2M equipment to store the confidential information of this communications system to operate the equipment.

For example, remote operation such as teleoperation etc. can be achieved by exchange of information with an IoT device incorporating the information terminal 7 and connected to the communications device 2 or incorporating the communications device 2. More specifically, a piece of operation equipment (control equipment) incorporating the information terminal 7 and a piece of actuation equipment incorporating the information terminal 7 are connected to each other via the network 1, the operation equipment and the actuation equipment also incorporate the communications devices 2, 2 or are connected thereto, to function as an IoT device and an M2M device, respectively, and share their sensing information and sequence information with each other through mutual communications. As a result, the operation equipment and the actuation equipment are each configured to be capable of exchanging data with the data reception unit 22$h$ and the data distribution unit 22$l$ of the communications device 2.

The user causes the personal computer or mobile terminal for use in data acquisition to acquire his/her own sensor or camera information continuously to connect to the information terminal 2 using the user ID and the password. For example, by selecting an ID or IDs of one or more pieces of IoT equipment registered in advance via the an IoT slip GUI or IoT communication connection screen, device authentication is performed on one or more communications device 2 connected to the IoT equipment via the communications device 2 connected to or integrated in his/her own IoT personal computer or mobile terminal or a management device function incorporated in a SIM card integrated into the management device 3 or mobile terminal. The specific authentication procedure is as described above. When the authentication has been normally performed, then the pieces of data are acquired successively by his/her own IoT personal computer or mobile terminal and the pieces of data are stored if necessary.

Also, with regard to virus check is performed on the data exchanged in the communications between the communications device 2 and the management device 3 or between the communications devices 2, 2, by the communications device 2 or the management device 3 on the transmitting side or the receiving side, and if a virus has been detected, the data as such is discarded or deletion of the virus from the data is performed. Further, the communications device 2 or the management device 3 on which the virus check has been performed may send back the data from which the above-described virus has been deleted to the transmission source or may notify the presence of the virus to the transmission source. In addition to this, the processes of the virus check or deletion of the virus can be performed not only by a dedicated monitoring server installed in a domestic area or overseas area but also by consigning the processes to a service company specialized in virus check. In addition to this, the processes may be delegated to an existing domestic or overseas virus check server to reduce the processes. Also, for reduction in the burden of the virus check process and other processes described above, multiple management devices 3 may be provided such that various processes are assigned to them.

Also, the recovery procedure in the case where it has been determined by the abnormality determination unit 22$q$ that an abnormality occurred has been described by way of an example where the recovery procedure is performed by the management device 3, but the recovery work can also be done by this communications system as a whole. Specifically, when the above-described determination confirming the occurrence of the abnormality has been made, the occurrence of the abnormality is notified to all the communications devices 2 that manage the same group. After that, when recovery from the abnormal state is to be made, authenticated user of the communications device 2 on which the abnormality occurred obtains permission from the system administrator of the management device 3 or any other person in charge of management of groups such as the boss of the user and confirms the permission information by the connection device 28 or by means of personal authentication such as biometric authentication on the system administrator or the person in charge of management of groups and carries out the recovery work upon confirmation of the same information.

Also, when the above-described determination confirming the occurrence of the abnormality has been made while the communication via the management device 3 is performed and recovery from the abnormality should be performed, then the network administrator of this communications system who is going to permit the recovery at issue indicates his/her intention to do so by the connection device 28 or by means of personal authentication such as biometric authentication and, upon confirmation of this intention, the authenticated user of the communications device 2 on which the abnormality occurred sends the application information requesting the recovery to the system administrator having the administrator privilege on the management device 3. The system administrator of the management device 3, upon reception of the application form, performs the recovery work to recover the communications device 2 and notifies the recovery to all the communications devices 2 having the information on the same group as the group stored in this communications device 2.

Also, viewing by even the administrator may be prohibited such that, when a general user has stored the encrypted target data, which was encrypted by the above-described GUI on the information terminal 7, in the storage unit 21 of the communications device 2, then provision of the privilege to access the target data is limited to the general user who has performed the encryption and a general user who receives the same target data.

Also, according to the device-to-device communication, in order to prevent falsification of data, hash data may be used. For example, target data and its hash data, or destination information and its hash data may be used.

Further, general-purpose PC equipment or general-purpose communication terminals incorporating a storage device or a memory card in which the communication program is stored may be used as the communications device 2.

Also, in this example, it is possible to perform data exchange within a group or between users belonging to the same group, group authentication to use this group may be performed. Specifically, a particular part or all pieces of the information of the user belonging to one group should be entered and the communication using this group is only allowed to be performed when the correct information has been entered. Incidentally, when many users belong to the group, the users may be sorted in accordance with their attributes such as country, area, age, man/woman, hobby, and the like within the group to create subgroups or the like.

Also, the above-described GUI imitating a slip can be used in slip entry in Internet shopping, etc. Specifically, it will be convenient to automatically output a piece of information that appear to be identical (e.g., information of the purchaser) among the pieces of information entered in the past from the stored pieces of data such that only pieces of information such as purchase date, service name, product name, unit price, and total price need to be newly entered.

Also, this communications system can be applied to concealed calls using voice data as the target data. Specifically, two communications devices 2, 2 are interposed between two information terminals 7, 7 on which the telephone application is installed, and streaming encryption is applied to the device-to-device communication between these two communications devices 2, 2 to perform encryption of voice data to be transmitted and received between two (or among three or more) information terminals 7,7.

Also, this communications system can be used for concealed e-mails. Specifically, dedicated GUIs such as an envelope are used on a per-group basis to encrypt the target data such as e-mail and an attached file and subject part or all of the pieces of target data to masking processing on data subdivision scrambling processing and color conversion processing which are reversibly performed and transmit and receive the processed data via the device-to-device communication.

Further, this communications system can be applied to electronic medical records. Specifically, masking processing is performed on the portion corresponding to the personal information of the electronic medical record to store it in a cloud server connected to the external network 1 and viewing, addition, modification, and deletion thereof are performed via the communications device 2 when the viewing is necessary.

Also, this communications system can be used as countermeasures for prevention of lost articles. For example, a GPS sensor terminal is used as the transmitting-side information terminal 7A so as to be capable of wireless communications with a portable transmitting-side communications device 2A, and the GPS sensor terminal is secured to the user's item such as a bag. By means of the smartphone owned by the user, the GPS position information of the user is always transmitted to the cloud server and the like, and when the GPS position information transmitted from the transmitting-side information terminal 7A via the transmitting-side communications device 2A does not agree with the user's GPS position information, it may be determined that the user's item is remote from the user, and this fact may be notified.

A seismic sensor, a surveillance camera, a vital check sensor, a measuring instrument, and/or other sensors may be incorporated in the IoT equipment having the transmitting-side information terminal 7A or the information terminal function for encryption and decryption of the captured data and sensing information between the two communications devices 2, 2 or between pieces of the IoT equipment so as to transmit them to the receiving-side information terminal 7B. In addition, when any abnormality has occurred in the captured data or the sensing data, notification of the abnormality is performed. The notification of the abnormality may be issued from the transmitting-side information terminal 7A or may be issued from the receiving-side information terminal 7B. Further, as needed, data may be subjected to the masking processing to conceal part of the information.

A personal computer or a smartphone of a user may be defined as the communications terminal 7, and a communications device 2 such as a modular IC memory device and USB memory device may be attached to the communications terminal 7 to encrypt transmission and reception of information with an on-line bank, a mail-order company, and a company or individual providing the service of escrow. Also, client information may be managed in a separate manner between a company providing the service of escrow and a mail-order company may be independently and implement countermeasures against information leakage.

Next, another embodiment of the communications system in which the present invention is implemented is described, where portions different from the above-described embodiment is described.

In the above-described mode, explanations have been provided by way of an example where the transmitting-side communications device 2A and the receiving-side communications device 2B exchange target data directly via a global network, but one or more communications devices 2 or one or more management devices 3 may reside between them for indirect exchange of the target data.

Specifically, the connection is established in order of: the transmitting-side communications device 2A→the communications device 2 (or the management device 3)→ . . . → the communications device 2 (or the management device 3)→ the receiving-side communications device 2B. In this case, the two devices adjacent to each other are provided with device authentication information such as the same or corresponding ID and password, and encryption key or trigger information triggering generation of them, which are specified and stored in the storage area that cannot be accessed from outside such as the secret are defined in the CPU from among the storage units 21 of the communications device 2 and the storage units 31 of the management device 3 in advance at the time of shipment or the like by the system administrator such that they can perform encrypted communication with each other. It should be noted that multiple pairs of the user information and the confidential information may be stored in advance so as to be changed at a predetermined timing or by a predetermined trigger information. Also, the exchange of the target data is carried out by the data transmission unit 22*i* and the data reception unit 22*k* of the communications device 2, or by the data transmission unit (not shown) and the data reception unit (not shown) having the same or substantially the same configurations as those of the data transmission unit 22*i* and the data reception unit 22*k* provided in the management device 3, and the communication channel which finally reaches the destination is held by the respective communications devices 2 or the management device 3.

Next, another embodiment of the communications system in which the present invention is implemented is described, where portions different from the above-described embodiment is described.

Figure 19:
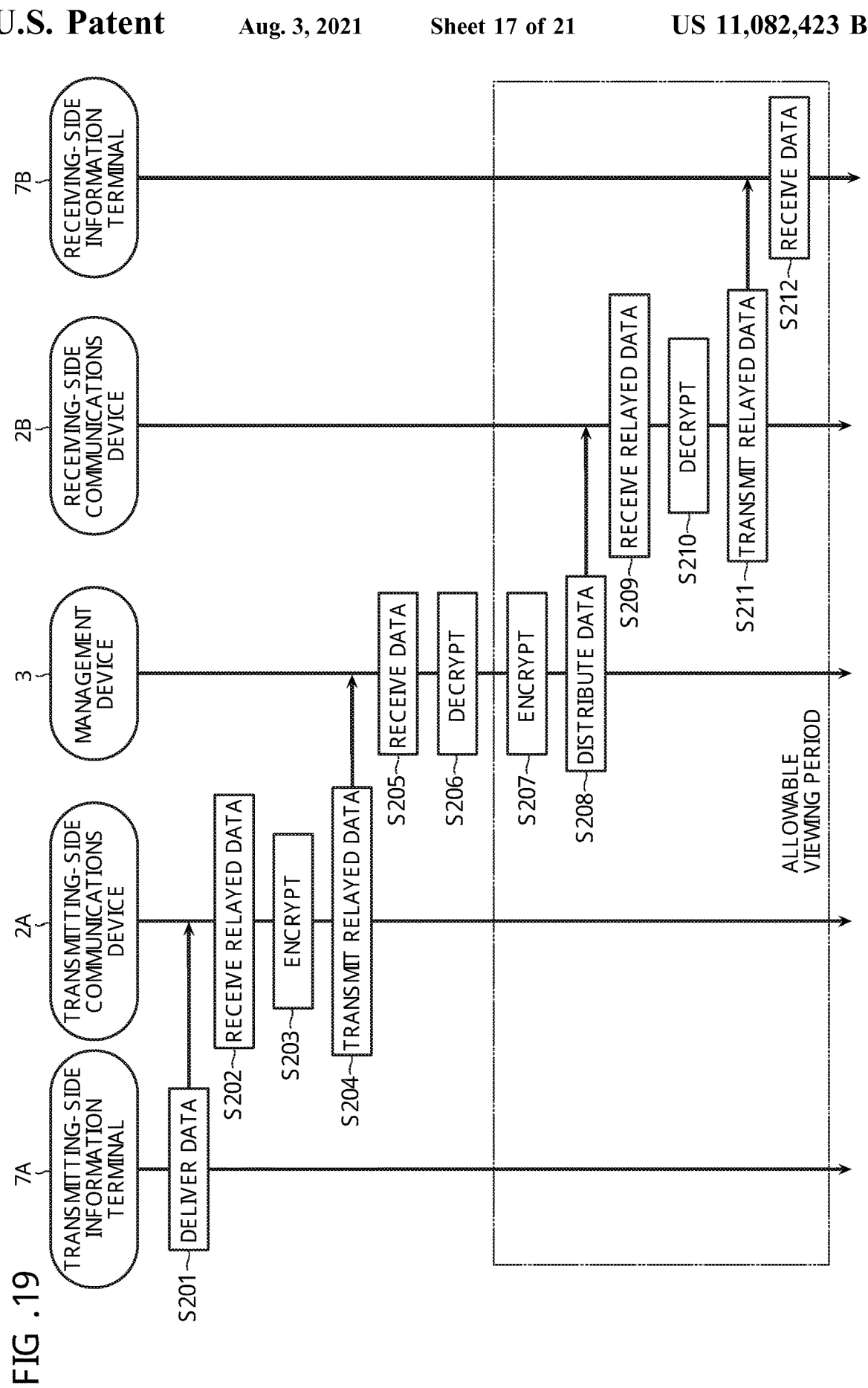
FIG. 19 is a flow diagram illustrating a processing procedure of exchange of target data by a communications system according to another embodiment.

FIG. 19 is a flow diagram that illustrates the processing procedure of the exchange of the target data in a communications system according to another embodiment. In the embodiment illustrated in the same figure, the management device 3 includes a data reception unit (not shown), a data distribution unit (not shown) and a viewing regulation unit (not shown) having the same or substantially the same configurations as those of the data reception unit 22*h*, data distribution unit 22*l* and the viewing regulation unit 22*m*, respectively, and the respective communications devices 2 includes a relay data reception unit 22*t* and a relay data transmission unit 22*u* configured to relay the target data to the management device 3.

In this communications system, encrypted communications are established in advance between the transmitting-side communications device 2A and the management device 3, and between the management device 3 and the receiving-side communications device 2B, respectively, according to the above-described scheme, and the communication states are maintained. By virtue of this communication state, it is made possible to access the management device 3 which cannot be accessed in normal states from the transmitting-side information terminal 7A or the receiving-side information terminal 7B. In addition, it is made possible to provide the above-described GUIs as illustrated in FIGS. 16 to 18 from the storage unit 31 of the management device 3 via the input/output unit 32*g*.

Incidentally, the ID or the password for performing device-to-device authentication, encryption keys for encryption and decryption or the trigger information triggering generation of these keys are shared between the transmitting-side communications device 2A and the management device 3, and, between the management device 3 and the receiving-side communications device 2B. In the meantime, according to this configuration, since information concentrates at the management device 3, it is necessary to sufficiently implement countermeasures against information leakage, and the management associated with the individual identifiable information should be implemented more strictly. Specifically, when an access is made to the management device 3, authentication that can identify individuals such as fingerprint authentication, voice authentication, face authentication, etc. is performed, and the access logs are stored as well. Also, massage about maintenance information, group modification information, fees and the like may be sent from the management device 3 to the information terminal 7 of the user using this communications system. Further, advertisement information or questionnaire information, and the like may be transmitted from the management device 3. Also, in view of the fact that the connection information concentrates at the management device 3, one or more file servers (not-shown) configured for backup or mirroring of data of the management device 3 may be independently provided.

At the time of the transmission and reception of data, first, the transmitting-side information terminal 7A passes the target data to the management device 3 via the input/output unit 32*g* of the management device 3 (S201).

The transmitting-side communications device 2A forcibly receives the target data sent toward the management device 3 by the relay data reception unit 22*t* (S202), and encrypts the target data that has been received by the encryption unit 22*a* (S203), and transmits the target data that has been encrypted by the relay data transmission unit 22*u* to the management device 3 (S204).

The management device 3 receives the encrypted data by the data reception unit (S205), and decrypts it by the decryption unit 32*b* of the management device 3 (S206). The device authentication list (device ID and password, etc.) for performing device-to-device authentication and encryption keys for performing, encryption and decryption or trigger information triggering generation of these keys are stored in advance in the storage units 21, 31 and shared between the transmitting-side communications device 2A and the management device 3. It should be noted that not all pieces of data are subjected to the decryption by the management device 3 and, the decryption may only be performed on the minimum number of pieces of data needed in the transfer (e.g., only the header information for device authentication), in addition to which the target data may not be decrypted at all and the header information necessary for the transfer may be separately received from the transmitting-side communications device 2A. As a result, the target data will not be able to be confirmed on the side of the management device 3, so that the leakage of data from the side of the management device 3 is prevented and thus the security is further enhanced.

If a request for reception of the decrypted target data is issued from the receiving-side information terminal 7B of the user designated as the recipient and a state is entered where the regulation by the viewing regulation unit of the management device 3 is lifted, then the management device 3 encrypts the target data by the encryption unit of the management device 3 (S207) and distributes the encrypted target data by the data distribution unit of the management device 3 to the receiving-side communications device 2B arranged on the side of the receiving-side information terminal 7B (S208). It should be noted that, as described in the foregoing, when not all of the pieces of target data are decrypted, the data is sent on an as-is-basis to the receiving-side communications device 2B.

The receiving-side communications device 2B receives the distributed target data using the relay data reception unit 22*t* (S209) and decrypts the received target data by the decryption unit 22*b* of the receiving-side communications device 2B (S210). The ID, the password, the encryption keys or trigger information for triggering generation of these for performing encryption and decryption are stored in advance in the storage units 21, 31 and shared between the management device 3 and the receiving-side communications device 2B.

The receiving-side communications device 2B transmits the above-described decrypted target data to the receiving-side information terminal 7B by the relay data transmission unit 22u (S211). The receiving-side information terminal 7B receives the transmitted target data (S212).

According to the communications systems configured as described in the foregoing, the respective communications devices 2 has only to implement sharing of the connection information to connect to the management device 3 and confidential information for encryption or authentication, and these pieces of information can be managed integrated manner on the side of the management device 3. Also, the same applies also to the user information, the group information, and the company information. Incidentally, regardless of the fact that the information terminal 7 is engaged in exchanging information with the management device 3, the information during the exchange is automatically relayed by the communications device 2 and encrypted, almost no time or labor of users is required.

Incidentally, in the example illustrated in FIG. 14 and FIG. 15, the communications device 2 and the management device 3 do not need to maintain the device-to-device connection permanently. The connection between them can be limited to the initial communication. In contrast, in the mode illustrated in FIG. 19, it is desirable that the communications device 2 and the management device 3 are always connected to each other.

It should be noted that one or more different communications devices 2 or management devices 3 may reside between the transmitting-side communications device 2A and the management device 3, and between the management device 3 and the receiving-side communications device 2B according to the above-described scheme.

Also, the management device 3 relays all pieces of data and has functionality covering part of those of the transmitting-side communications device 2A and the receiving-side communications device 2B of the above-described mode, so that it can function as a cloud server.

Further, the communications device 2 may be configured such that it is connected to the side of the management device 3 when the user attempts to connect to the communications device 2 using the information terminal 7. In this case, the user is allowed to exchange data via the management device 3 without being aware of the management device 3.

Also, the decryption process (S206) and the encryption process (S207) by the management device 3 may be omitted to reduce the processing load. In this case, the information of the receiving-side communications device 2B and the receiving-side information terminal 7B distributing the target data should be directly acquired from the transmitting-side communications device 2A or the transmitting-side information terminal 7A.

Also, in the access from the transmitting-side information terminal 7A to the management device 3, first, the transmitting-side information terminal 7A accesses the transmitting-side communications device 2A and the transmitting-side communications device 2A accesses the management device 3. Likewise, in the access from the receiving-side information terminal 7B to the management device 3 as well, first, the receiving-side information terminal 7B accesses the receiving-side communications device 2B and the receiving-side communications device 2B accesses the management device 3.

Next, another embodiment of the communications system in which the present invention is implemented is described, where portions different from the above-described embodiment is described.

Figure 20:
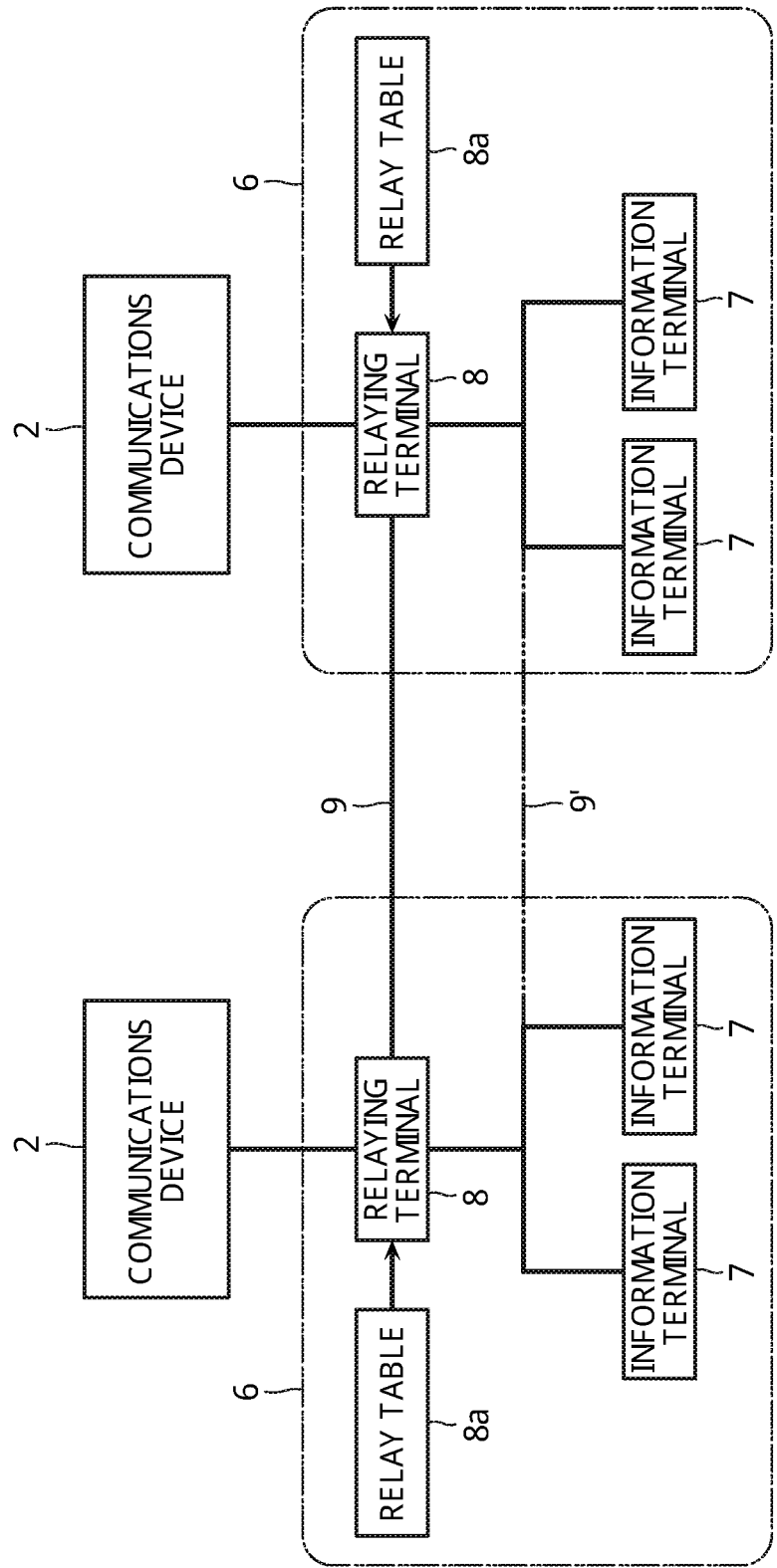
FIG. 20 is an explanatory diagram illustrating an outline of a communications system according to another embodiment of the present invention.

FIG. 20 is an explanatory diagram that illustrates an outline of a communications system according to another embodiment of the present invention. In the example illustrated in the same figure, a relaying terminal 8 configured to relay communications of the information terminal 7 with the communications device 2 is provided in the internal network 6. Information on the relay channel is held by the relaying terminal 8 as a relay table 8a.

In addition, the relaying terminal 8 in one internal network 6 is connected to the relaying terminal 8 in another internal network 6 via a connection line 9. When the communications device 2 on the side of the one internal network 6 breaks down, the information terminal 7 on the side of the one internal network can use the communications device 2 on the side of the other internal network as a substitute. Addition, modification, deletion, and the like of the relay channel is performed in accordance with an instruction from the management device 3 of the system administrator, the information terminal 7 of a person in charge of management of each group, or the like through addition, modification, deletion, or the like of information to, in, or from the relay table 8a of the relaying terminal 8.

It should be noted that an information terminal 7 in one internal network 6 and an information terminal 7 in another internal network 6 may be connected via a connection line 9'.

Further, the relaying terminal 8 can be replaced by the information terminal 7.

Next, another embodiment of the communications system in which the present invention is implemented is described, where portions different from the above-described embodiments is described.

Figure 21:
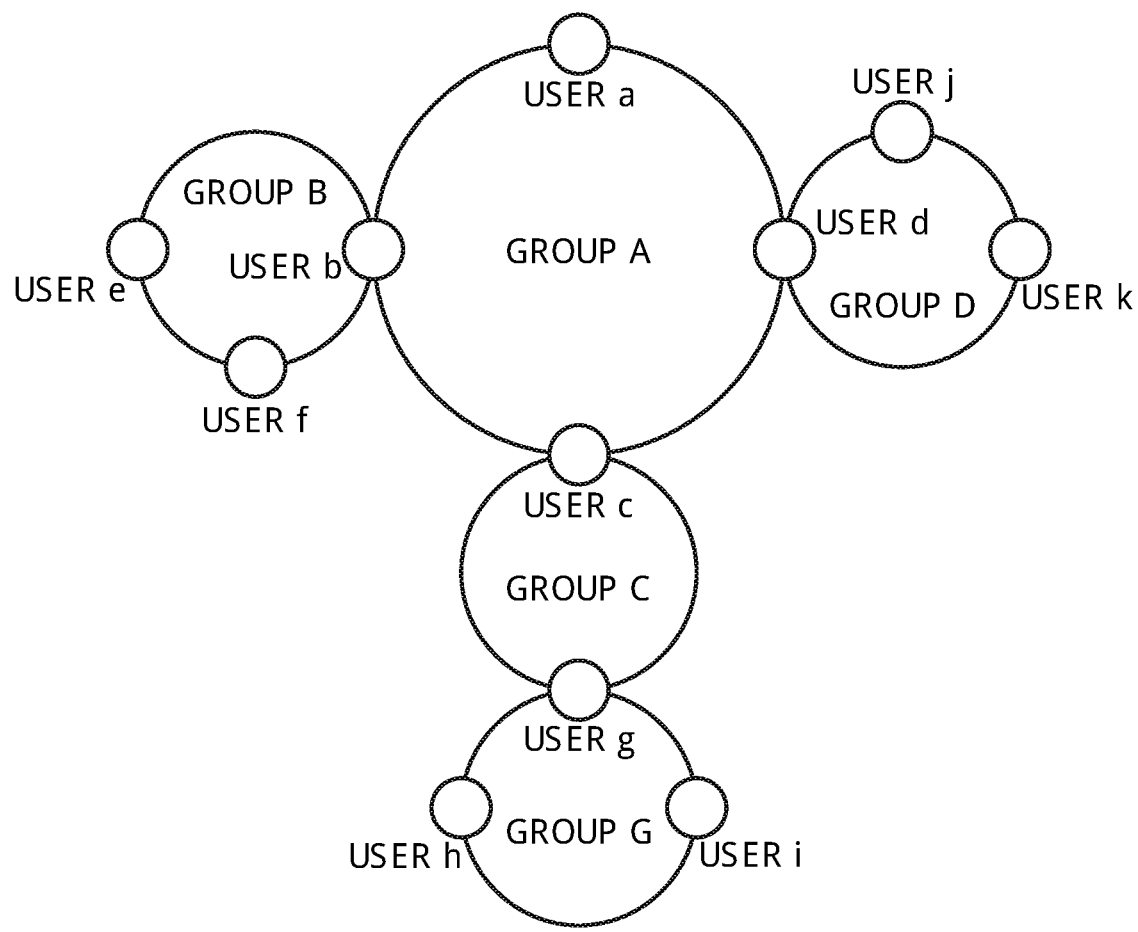
FIG. 21 is an explanatory diagram illustrating an outline of a group configuration according to another embodiment of the present invention.

FIG. 21 is an explanatory diagram that illustrates an outline of the group configuration according to another embodiment of the present invention. In this communications system, a new group or a new user can be added by the external connection device 28 or in accordance with the above-described update scheme, by virtue of which, operation that abound in redundancy can be enabled. For example, in the example illustrated in FIG. 21, one group A is created by a user "a" and three users "b," "c," and "d" are added into the group A, and these three users "b," "c," and "d" create the groups B, C, and D, respectively, and a user "g" put into the group C crates the group G.

By adding groups and users in a chained manner, it is made possible to perform operations with high redundancy. Specifically, according to the device-to-device communication within a group like this, in this manner, anybody can create a dedicated group freely at any time, so that dedicated communication network having high security can be freely added and modified for the communications device 2 although limitations may remain to exist.

Next, another embodiment of the communications system in which the present invention is implemented is described, where portions different from the above-described embodiments is described.

Figure 22:
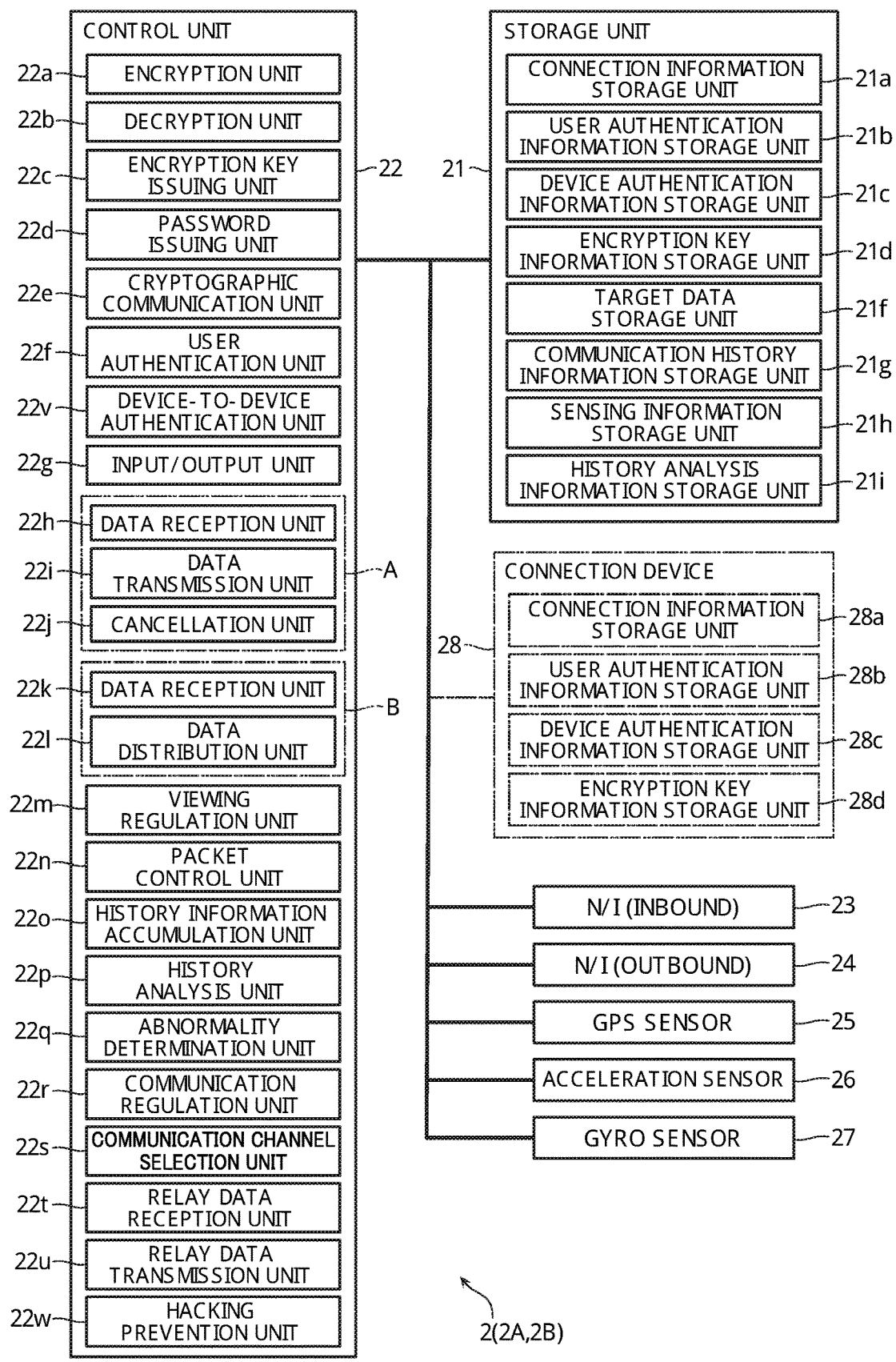
FIG. 22 is an explanatory diagram illustrating a configuration of a communications device according to a different embodiment of the present invention.

FIG. 22 is an explanatory diagram that illustrates the configuration of the communications device according to a different embodiment of the present invention. The control unit 22 further includes a hacking prevention unit 22w. The hacking prevention unit 22w is configured to: periodically change the port used in the communication; periodically urge users to change their passwords; automatically update the operating systems and software programs to keep them up to data so as to prevent hacking. It should be noted that the hacking prevention unit 22w may be provided in the control unit 32 of the management device 3 so as to prevent hacking on the management device 3.

Next, another embodiment of the communications system in which the present invention is implemented is described, where portions different from the above-described embodiments is described.

Figure 23:
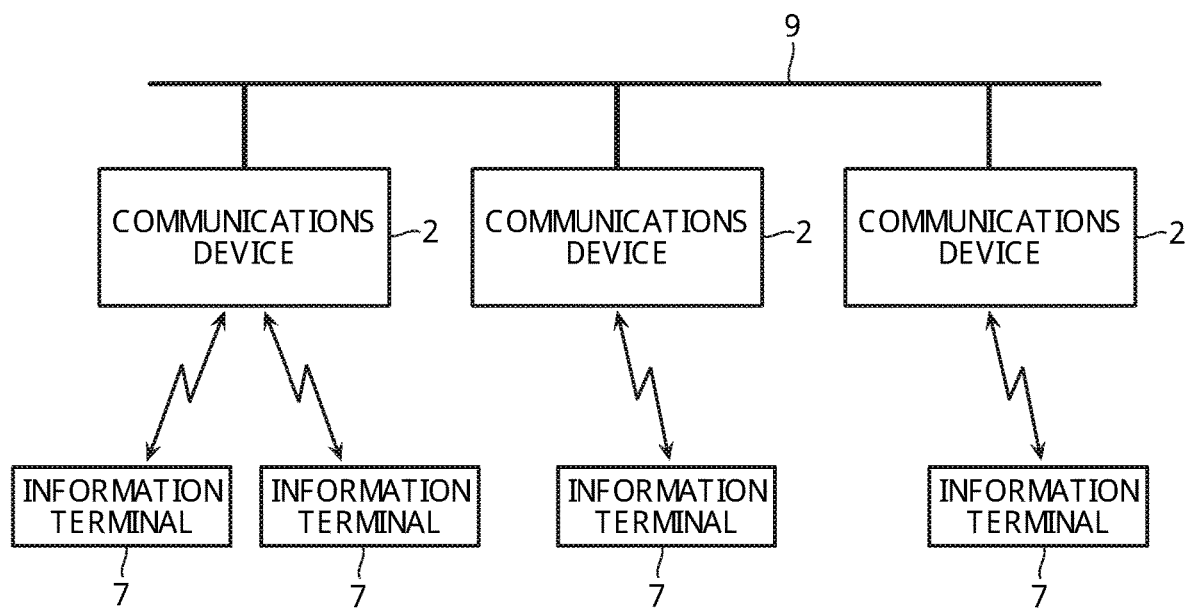
FIG. 23 is an explanatory diagram illustrating an outline of a communications system according to a different embodiment of the present invention.

FIG. 23 is an explanatory diagram that illustrates an outline of the communications system according to a different embodiment of the present invention. In the example illustrated in the same figure, the information terminal 7 includes a device that transmits and receives various pieces of data of a personal computer, smartphone, and tablet terminal operated by the user as well as IoT equipment, M2M equipment, camera, robot, remote operation equipment, automobile, AI equipment, and the like and, for example, constituted by an IoT terminal capable of wireless communications with the communications device 2, or a device capable of wireless communications with the communications device 2 configured to perform sensing by a sensor, and machine-controlled. The communications device 2 may transmit commands for controlling the IoT equipment, M2M equipment, camera, robot, remote operation equipment, AI equipment, and the like to control these devices.

Multiple communications devices 2 are provided and connected to each other to be capable of communications via the network 9. The network 9 may be a global network, may be a private network, or may be a network configured by combining them.

The one information terminal 7 is capable of cryptographic communication via a pair of communications devices 2, 2 with the other information terminal 7. As a result, it is made possible to share the sensing information of all the information terminals 7 to use it as big data, it is made possible for the one information terminal 2 to monitor the sensing information from the other information terminal 7, or it is also made possible to machine-control the information terminal 7.

According to this configuration, it is made possible to implement robot control using M2M. Further, it is made possible to make use of IoT to implement cooperative control between automobiles allowed to acquire position information of pedestrians and wheelchair users, in addition to which it is made possible to perform communications with pedestrians, automobiles, wheelchairs, bus stops, trains, stations, airports, public facilities, private facilities, traffic lights, etc. In addition, making use of them makes it possible to: perform vital check for people with disabilities to notify abnormality; issue warning when a wheelchair enters a dangerous area; and perform vital check of the person using the wheelchair to confirm safety, and the like.

REFERENCE SIGNS LIST

1: global network
2: communications device
2A: transmitting-side communications device (communications device)
2B: receiving-side communications device (communications device)
21: storage unit
22: control unit
23: inbound network interface
24: outbound network interface
25: GPS sensor (state detection sensor, position information acquisition sensor)
26: acceleration sensor (state detection sensor)
27: gyro Sensor (state detection sensor)
28: connection device
3: management device
7: information terminal
7A: the transmitting-side information terminal
7B: the receiving-side information terminal

The invention claimed is:

1. A communications system enabling a plurality of information terminals included in a same group to exchange data with each other via a global network, the communications system comprising:
a first information terminal and a second information terminal of the plurality of information terminals; and
a plurality of communications devices including:
a first communications device connected to the first information terminal in the group so as to perform mutual communication of high confidentiality between the plurality of information terminals included in the group, the first communications device including a first memory storing (i) first user authentication information required to authenticate a user of the first information terminal, and a device authentication list listing pieces of device authentication information necessary in authentication of each communications device with regard to all the plurality of communications devices in the same group, the device authentication list being pre-stored in a state where at least part of the device authentication list is inaccessible from outside of the first communications device, and the communications device is configured to perform, when exchange of data is performed between the plurality of information terminals via the global network, a first user authentication process with the first information terminal using the first user authentication information, and
a second communications device connected to the second information terminal in the group so as to perform mutual communication of high confidentiality between the plurality of information terminals included in the group, the second communications device including a second memory storing (i) second user authentication information required to authenticate a user of the second information terminal, and (ii) the device authentication list, the device authentication list being pre-stored in a state where at least part of the device authentication list is inaccessible from outside of the second communications device, and the second communications device is configured to perform, when exchange of data is performed between the plurality of information terminals via the global network, a second user authentication process with the second information terminal using the second user authentication information, wherein:
the first communications device and the second communications device are configured to perform a device-to-device authentication process between the first communications device and the second device communications device by referring to the stored device authentication list.

2. The communications system according to claim 1, further comprising a management device connected to the global network and configured to carry out at least part of the device-to-device authentication process between the plurality of communications devices, wherein:
the device authentication list lists pieces of device authentication information necessary in authentication of (i) at least one of the first and second communications device and (ii) the management device with regard to all the plurality of communications devices and all of management devices, which includes the management device, in the same group, and
the management device has a memory pre-storing the device authentication list in a state where at least part of the device authentication list is inaccessible by the user.

3. The communications system according to claim 2, wherein:
the plurality of communications devices includes already-registered communications devices and an unregistered communications device;
the device authentication list includes device authentication information including a device ID and a password of a valid user of each the already-registered communications devices in the group and device authentication information including a device ID and a password of a provisional user predefined for the unregistered communications device in the group; and
the management device or the at least one of the first and second communications device enables the device ID and the password of the provisional user when a new user is registered in the group, and notifies the enabled device ID of the user to all of the plurality of communications devices.

4. The communications system according to claim 2, wherein:
the device authentication list includes a provisional group name predefined for an unregistered group and device authentication information including a device ID and a password of a provisional user included in the provisional group name; and
when a new group is registered, the management device or the at least one of the first and second communications device rewrites the provisional group name to a true group name, enables a device ID and a password of at least some of the provisional users of the true group name, and notifies the rewritten true group name and the device ID of the enabled users to a communications device of the plurality of communications devices of the enabled user of the new group.

5. The communications system according to claim 2, wherein at least part of (i) an encryption key for performing encrypted communication between the plurality of communications devices and between at least one of the first and second communications device and the management device or (ii) trigger information for triggering generation of the encryption key is stored in the memory of the management device in a state where the at least part of the encryption key or the trigger information is inaccessible from the user.

6. The communications system according to claim 2, wherein the at least one of the first and second communications device or the management device exchanges data including information acquired from IoT equipment or M2M equipment.

7. The communications system according to claim 2, wherein the at least one of the first and second communications device or the management device has an AI function performing machine learning based on data acquired from another communications device of the plurality of communications devices or another management device and providing an optimum solution.

8. The communications system according to claim 1, wherein:
the plurality of communications devices includes already-registered communications devices and an unregistered communications device;
the device authentication list includes device authentication information including a device ID and a password of a valid user of each of the already-registered communications devices in the group and device authentication information including a device ID and a password of a provisional user predefined for the unregistered communications device in the group; and
at least one of the first communications device and the second communications device enables the device ID and the password of the provisional user when a new user is registered in the group, and notifies the enabled device ID of the user to all of the plurality of communications devices.

9. The communications system according to claim 1, wherein:
the device authentication list includes a provisional group name predefined for an unregistered group and device authentication information including a device ID and a password of a provisional user included in the provisional group name; and
when a new group is registered, at least one of the first and second communications device rewrites the provisional group name to a true group name, enables a device ID and a password of at least some of the provisional users of the true group name, and notifies the rewritten true group name and the device ID of the enabled users to a communications device of the plurality of communications devices of the enabled user of the new group.

10. The communications system according to claim 1, wherein at least part of an encryption key for performing encrypted communication between the plurality of communications devices or trigger information for triggering generation of the encryption key is stored in the memory of at least one of the first and second communications device in a state where the at least part of the encryption key or the trigger information is inaccessible from the user.

11. The communications system according to claim 1, wherein the plurality of information terminals include pieces of equipment receiving and transmitting various pieces of data, and the equipment is at least one or more of a personal computer, a smartphone, or a tablet terminal operated by a user, IoT equipment, M2M equipment, a camera, a robot, remote operation equipment, an automobile, and AI equipment.

12. The communications system according to claim 1, wherein one of the first and second communications device includes:
a processor configured to:
determine whether permission for access is given in response to an access request from one of the plurality of information terminals based on user authentication information stored in the memory, and
perform the device-to-device authentication process with the other one of the first and second communications device based on the device authentication list stored in the memory;

an input/output device configured to input and output information to and from an information terminal of the plurality of information terminals to which permission to access is given; and a data transmitter/receiver configured to perform transmission and reception of data with the other one of the first and second communications device, which has been authenticated.

13. The communications system according to claim 12, wherein the input/output device is configured to display, to the information terminal, a data entry screen imitating a postal item or a slip as a user interface.

14. The communications system according to claim 1, wherein at least one of the first and second communications device includes a processor configured to:
    analyze communication history stored as needed in the memory; and
    determine an unauthorized access or an unauthorized operation based on a day-to-day operating status of the communication history of the at least one of the first and second communications device.

15. The communications system according to claim 1, wherein at least one of the first and second communications device includes a position sensor configured to acquire position information of the at least one of the first and second communications device, and the at least one of the first and second communications device is configured to determine whether the at least one of the first and second communications device is located at a position where the at least one of the first and second communications device should be originally used by referring to position information acquired from the position sensor.

16. The communications system according to claim 1, wherein at least one of the first and second communications device exchanges data including information acquired from IoT equipment or M2M equipment.

17. The communications system according to claim 1, wherein at least one of the first and second communications device has an AI function performing machine learning based on data acquired from another communications device of the plurality of communications devices and providing an optimum solution.

18. The communications system according to claim 1, wherein at least one of the first and second communications device includes a connection device pre-storing information, the connection device being configured to be removable.

19. The communications system according to claim 1, wherein at least one of the first and second communications device is an IC card or a SIM attached to the corresponding information terminal.

20. An information terminal used in at least one of the first and second communications device according to claim 1.

21. The communications system according to claim 1, wherein the plurality of communications devices includes:
    a third information terminal,
    a fourth information terminal,
    a third communications device connected to the third information terminal, and
    a fourth communications device connected to the fourth information terminal, wherein:
        the first information terminal and the second information terminal belong to a first group,
        the first information terminal and the third information terminal belong to a second group different from the first group,
        the second information terminal and the fourth information terminal belong to a third group different from the first group and the second group,
        the first information terminal communicates with the second information terminal within the first group via the first communications device and the second communications device,
        the first information terminal communicates with the third information terminal within the second group via the first communications device and the third communications device,
        the second information terminal communicates with the first information terminal within the first group via the second communications device and the first communications device, and
        the second information terminal communicates with the fourth information terminal within the third group via the second communications device and the fourth communications device.

* * * * *